US012090394B2

United States Patent
Suzuki et al.

(10) Patent No.: US 12,090,394 B2
(45) Date of Patent: *Sep. 17, 2024

(54) INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventors: Toshiaki Suzuki, Kyoto (JP); Yoshinori Tsuchiyama, Kyoto (JP); Izumi Fukuda, Nagasaki (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/505,545

(22) Filed: Nov. 9, 2023

(65) Prior Publication Data
US 2024/0075383 A1    Mar. 7, 2024

Related U.S. Application Data

(63) Continuation of application No. 17/174,605, filed on Feb. 12, 2021, now Pat. No. 11,872,477.

(30) Foreign Application Priority Data

Feb. 13, 2020   (JP) ................................ 2020-022643

(51) Int. Cl.
*A63F 13/24*   (2014.01)
*A63F 13/2145*   (2014.01)
(Continued)

(52) U.S. Cl.
CPC .......... *A63F 13/24* (2014.09); *A63F 13/2145* (2014.09); *G06F 3/0488* (2013.01); *G06F 3/1423* (2013.01)

(58) Field of Classification Search
CPC .. G06F 3/0488; G06F 3/04883; G06F 3/1446; G06F 3/1423; A63F 13/426;
(Continued)

(56) References Cited

U.S. PATENT DOCUMENTS 6,545,669 B1   4/2003 Kinawi
2005/0093868 A1   5/2005 Hinckley
(Continued)

FOREIGN PATENT DOCUMENTS

EP   2 369 461   4/2011
EP   3 305 380   4/2018
(Continued)

OTHER PUBLICATIONS

Extended European Search Report issued on Jul. 8, 2021 in corresponding European Application No. 21155754.1, 11 pages.
(Continued)

*Primary Examiner* — Shaheda A Abdin
(74) *Attorney, Agent, or Firm* — Nixon & Vanderhye, PC

(57) ABSTRACT

At a position including coordinates of an input start possible point on a first display, an image indicating the input start possible point is displayed, and at a position including coordinates of an input target point on a second display, an image indicating the input target point is displayed. Then, if a coordinate input to the first display includes an input to a position including the coordinates of the input start possible point, and a coordinate input to the second display includes an input to a position including the coordinates of the input target point, based on trajectories of coordinates of the coordinate inputs to the first display and the second display, a positional relationship between the first display and the second display is determined.

16 Claims, 24 Drawing Sheets

(51) Int. Cl.
*G06F 3/0488* (2022.01)
*G06F 3/14* (2006.01)

(58) Field of Classification Search
CPC ...... A63F 13/24; A63F 13/31; A63F 13/2145; G09G 2354/00
See application file for complete search history.

(56) References Cited

U.S. PATENT DOCUMENTS

| | | |
|---|---|---|
| 2006/0128468 A1 | 6/2006 | Yoshikawa |
| 2008/0291173 A1 | 11/2008 | Suzuki |
| 2009/0140986 A1 | 6/2009 | Karkkainen |
| 2010/0302281 A1* | 12/2010 | Kim ................. G06F 3/04883 715/702 |
| 2010/0309158 A1 | 12/2010 | Iwayama et al. |
| 2011/0109526 A1 | 5/2011 | Bauza et al. |
| 2011/0209104 A1 | 8/2011 | Hinckley |
| 2011/0234515 A1 | 9/2011 | Kamijima |
| 2012/0139946 A1 | 6/2012 | Tang |
| 2012/0249443 A1 | 10/2012 | Anderson |
| 2013/0044341 A1 | 2/2013 | Uchino |
| 2013/0120304 A1 | 5/2013 | Miyahara |
| 2013/0159942 A1 | 6/2013 | Mizunuma et al. |
| 2013/0194278 A1 | 8/2013 | Zajac, III |
| 2013/0290876 A1 | 10/2013 | Anderson |
| 2013/0321340 A1 | 12/2013 | Seo |
| 2014/0125697 A1 | 5/2014 | Suito |
| 2014/0289362 A1 | 9/2014 | Itoh |
| 2014/0375560 A1 | 12/2014 | Masuda |
| 2015/0180912 A1 | 6/2015 | Dufour |
| 2015/0186029 A1* | 7/2015 | Khani ................. G06F 3/1423 345/173 |
| 2018/0056192 A1 | 3/2018 | Kataoka |
| 2018/0101350 A1* | 4/2018 | Nonaka ................. A63F 13/428 |
| 2019/0037611 A1 | 1/2019 | Renn |
| 2019/0060755 A1* | 2/2019 | Motokura ............. A63F 13/537 |
| 2019/0129678 A1 | 5/2019 | Nonaka et al. |

FOREIGN PATENT DOCUMENTS

| | | |
|---|---|---|
| EP | 3 343 546 | 7/2018 |
| JP | 2005-278938 | 10/2005 |
| JP | 2008-203649 | 9/2008 |
| JP | 2010-286911 | 12/2010 |
| JP | 2011-048610 | 3/2011 |
| JP | 2011-248465 | 12/2011 |
| JP | 2013-125373 | 6/2013 |
| JP | 2013-196142 | 9/2013 |
| JP | 2013-200855 | 10/2013 |
| JP | 2013-210730 | 10/2013 |
| JP | 2013-218468 | 10/2013 |
| JP | 2013-246724 | 12/2013 |
| JP | 2014-123316 | 7/2014 |
| JP | 2014-186699 | 10/2014 |
| JP | 2015-079291 | 4/2015 |
| JP | 2015-212829 | 11/2015 |
| JP | 2016-051110 | 4/2016 |
| JP | 2018-060438 | 4/2018 |
| WO | 2012/176926 | 12/2012 |
| WO | 2014/054077 | 4/2014 |
| WO | 2014/129374 | 8/2014 |

OTHER PUBLICATIONS

Gonzalo Ramos et al., "Synchronous Gestures in Multi-Display Environments," retrieved Jul. 13, 2018, 105 pages.

* cited by examiner

F I G. 9
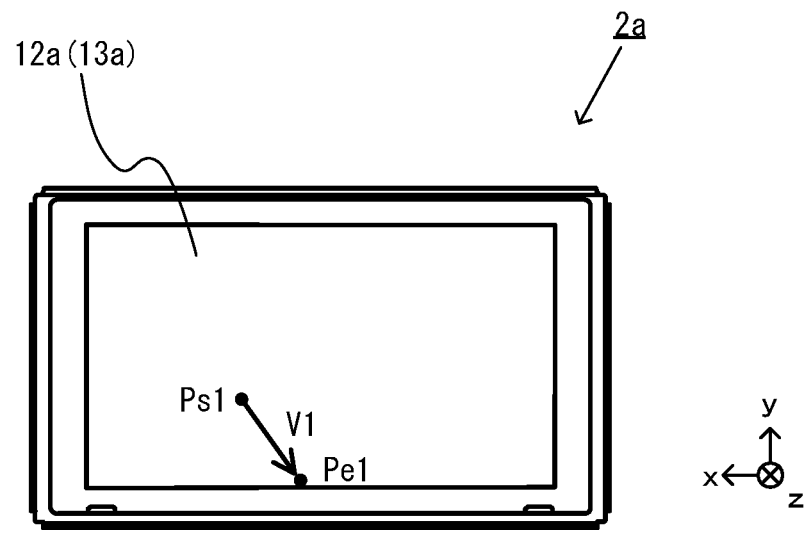
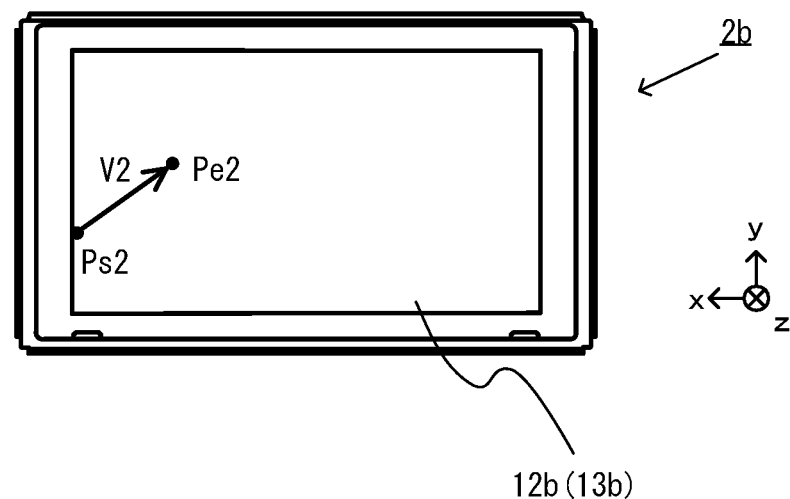

F I G. 1 1
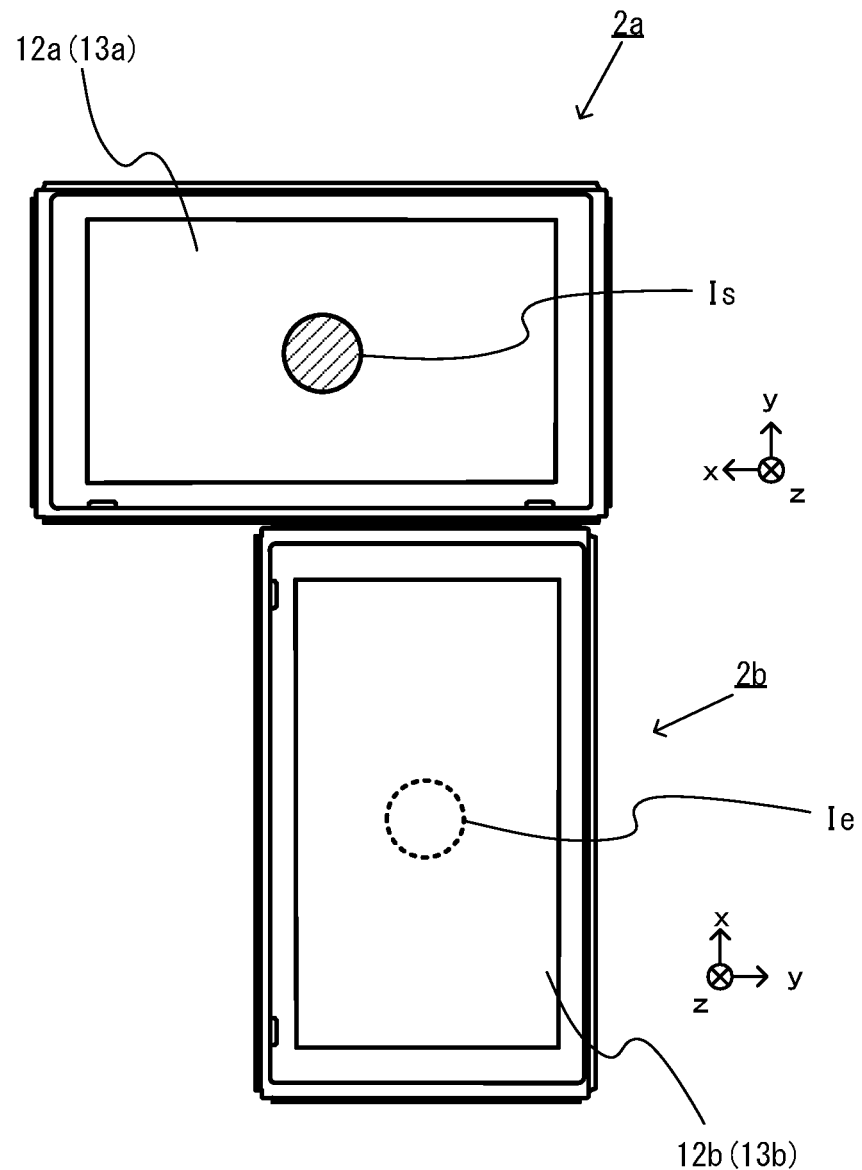

F I G. 1 3
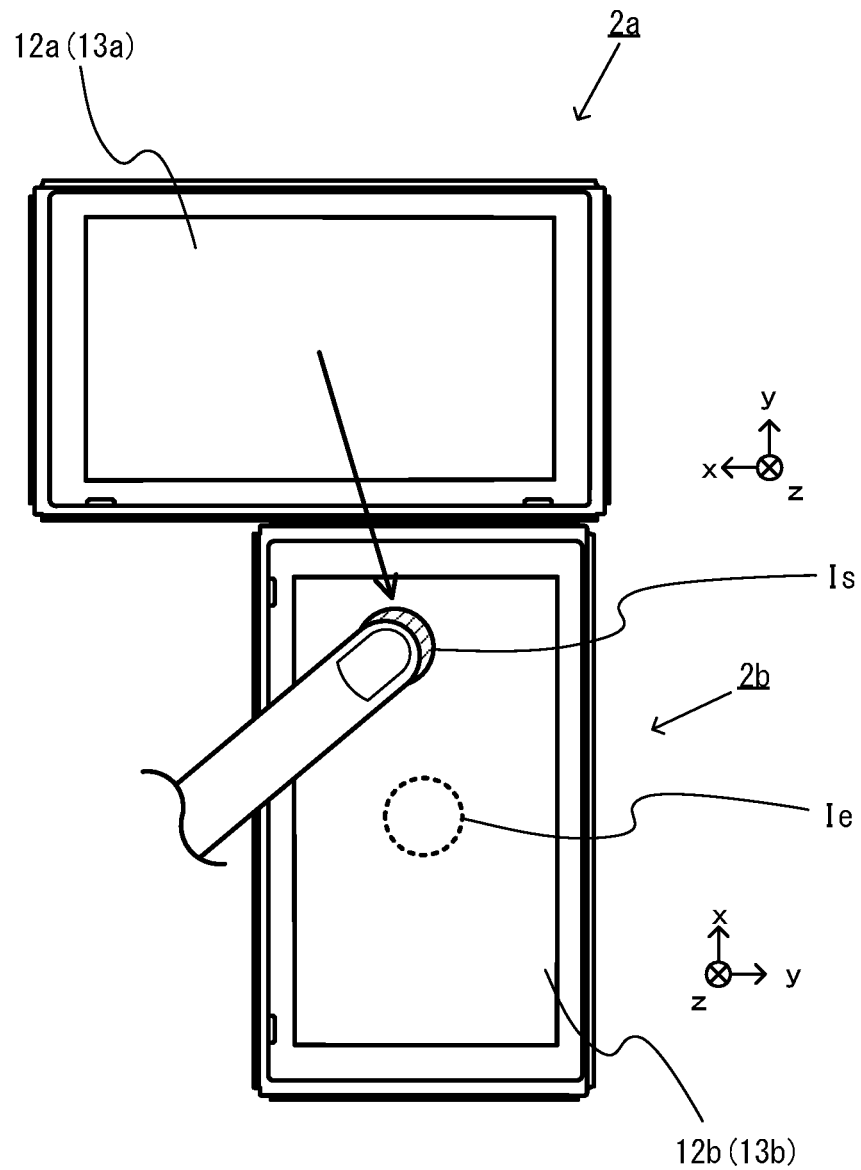

F I G. 1 5
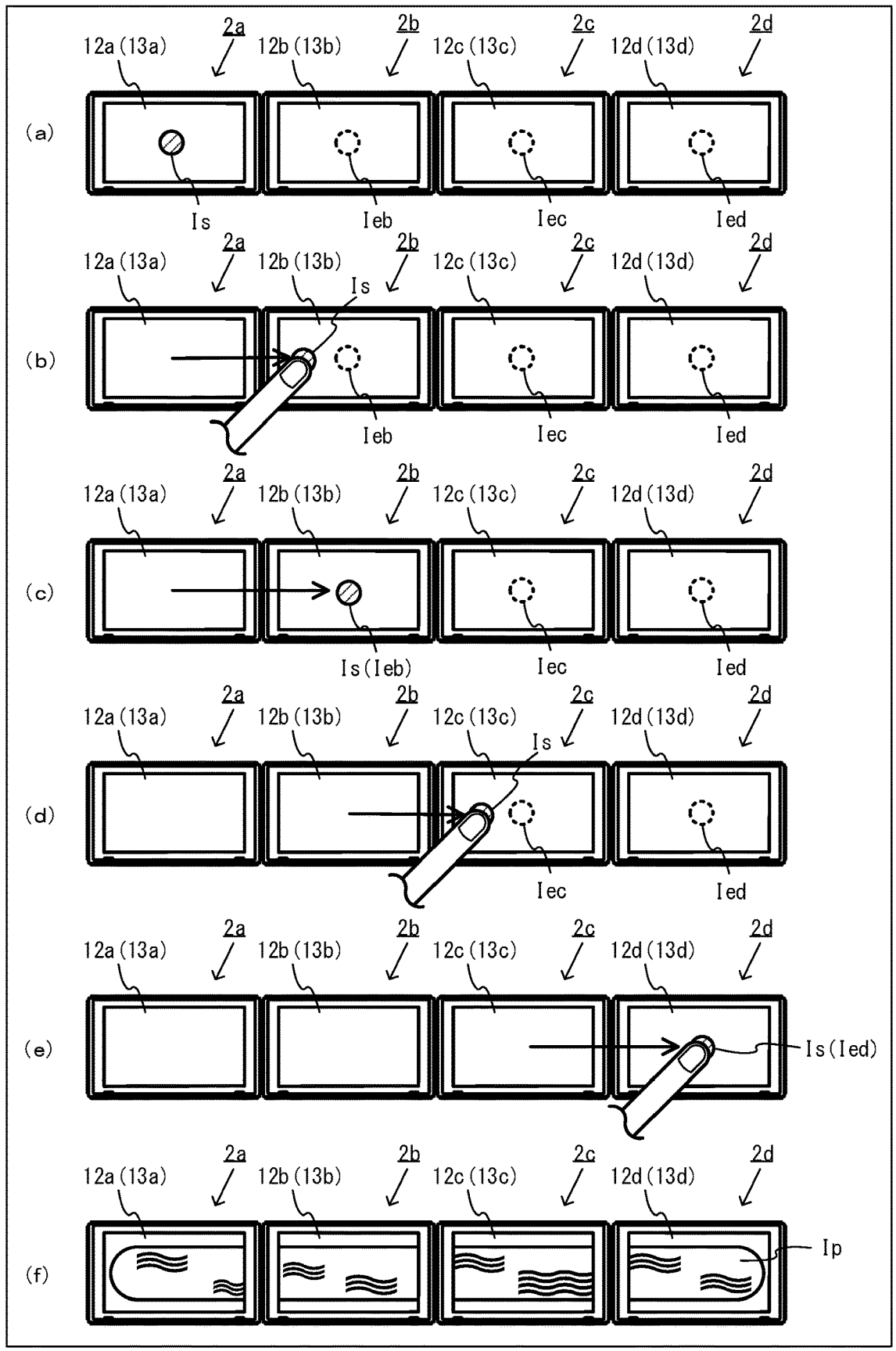

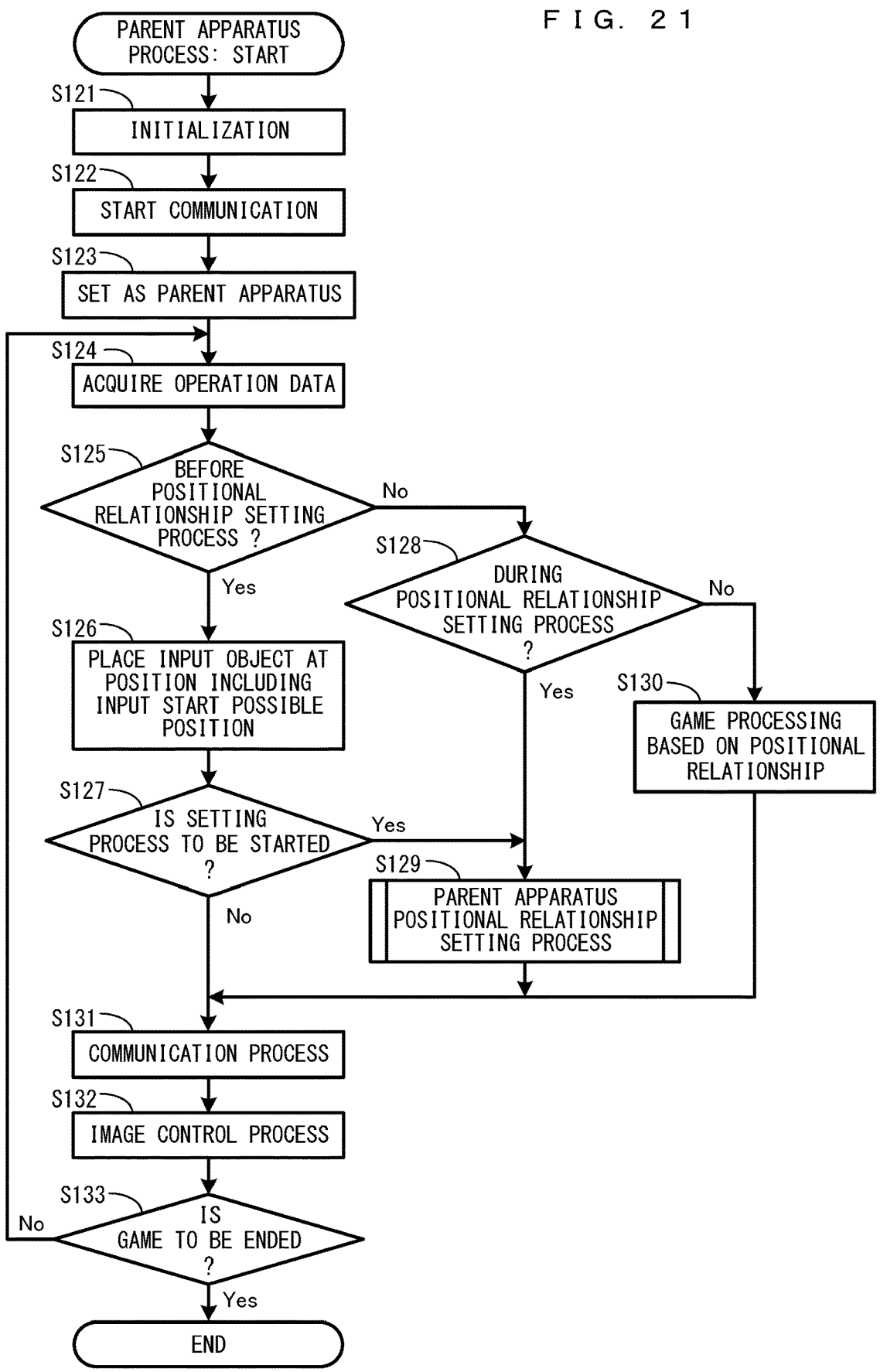
F I G. 2 1

INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

CROSS REFERENCE TO RELATED APPLICATION

This application is a continuation of U.S. patent application Ser. No. 17/174,605, filed Feb. 12, 2021, and this application also claims priority to Japanese Patent Application No. 2020-22643, filed on Feb. 13, 2020, the entire contents of each of which are incorporated herein by reference.

FIELD

The technology shown here relates to an information processing system, an information processing apparatus, a storage medium having stored therein an information processing program, and an information processing method for performing processing corresponding to an operation on a display.

BACKGROUND AND SUMMARY

Conventionally, there is an information processing apparatus that, in accordance with the execution of a slide operation from a first touch panel to a second touch panel, sets the positional relationship between the touch panels.

In the information processing apparatus, however, there is room for further improvement in notifying a user in an easily understandable manner of how to perform an operation for setting the positional relationship between the touch panels.

Therefore, it is an object of an exemplary embodiment to provide an information processing system, an information processing apparatus, a storage medium having stored therein an information processing program, and an information processing method that are capable of notifying a user in an easily understandable manner of an operation for setting a positional relationship.

To achieve the above object, the exemplary embodiment can employ, for example, the following configurations.

In an exemplary configuration of an information processing system according to the exemplary embodiment, an information processing system including at least an information processing apparatus includes: a first display; a second display; a first position detector configured to detect a coordinate input to the first display; a second position detector configured to detect a coordinate input to the second display; and a processor and a memory coupled thereto, the processor being configured to control the information processing system to at least: display, at a position including coordinates of an input start possible point on the first display, an image indicating the input start possible point; display, at a position including coordinates of an input target point on the second display, an image indicating the input target point; determine whether or not a first coordinate input detected by the first position detector includes an input to the position including the coordinates of the input start possible point; if it is determined that the first coordinate input includes the input to the position including the coordinates of the input start possible point, determine whether or not a first continuous coordinate input to the first display detected continuously from the first coordinate input satisfies a first coordinate condition; if it is determined that the first continuous coordinate input satisfies the first coordinate condition, determine whether or not a second coordinate input is detected by the second position detector after the first continuous coordinate input, and the detected second coordinate input satisfies a second coordinate condition; if it is determined that the second coordinate input is detected by the second position detector, and the detected second coordinate input satisfies the second coordinate condition, determine whether or not a second continuous coordinate input to the second display detected continuously from the second coordinate input includes an input to a position including the coordinates of the input target point; and if it is determined that the second continuous coordinate input includes the input to the position including the coordinates of the input target point, determine a positional relationship between the first display and the second display based on a trajectory of coordinates of the first continuous coordinate input and a trajectory of coordinates of the second continuous coordinate input.

Based on the above, it is possible to notify a user in an easily understandable manner of an operation for setting a positional relationship between a plurality of displays.

Further, the determination of whether or not the first continuous coordinate input satisfies the first coordinate condition may include, if the coordinates of the first continuous coordinate input are coordinates of an edge portion of the first display, determining that the coordinates of the first continuous coordinate input satisfy the first coordinate condition.

Based on the above, under the condition that a coordinate input is provided from an input start possible point to an edge portion of one of the displays, it is possible to set the positional relationship between the plurality of displays. Thus, using the trajectory of a relatively long coordinate input, it is possible to set the accurate positional relationship.

Further, the determination of whether or not the second continuous coordinate input satisfies the second coordinate condition may include, if coordinates of the second coordinate input are coordinates of an edge portion of the second display, determining that the second coordinate input satisfies the second coordinate condition.

Based on the above, under the condition that a coordinate input continuous from an edge portion of one of the displays to an edge portion of the other display is performed, it is possible to set the positional relationship between the plurality of displays.

Further, the display of the image indicating the input start possible point on the first display may include placing, as the image indicating the input start possible point, an image of a first movement object at the position including the coordinates of the input start possible point, and if it is determined that the first coordinate input includes the input to the position including the coordinates of the input start possible point, moving a position of the first movement object so that the first movement object is located at the coordinates of the first continuous coordinate input.

Based on the above, it is possible to indicate the start position of a coordinate input to the user in an easily understandable manner, and a first movement object following a coordinate input is displayed, whereby it is possible to urge the user to slowly perform a coordinate input operation on a first display.

Further, the display of the image indicating the input target point on the second display may include displaying, as the image indicating the input target point, an image corresponding to a shape of the first movement object at a position including the coordinates of the input target point.

Based on the above, it is possible to indicate a target position of a coordinate input to the user in an easily understandable manner.

Further, the display of the image indicating the input target point on the second display may include, if it is determined that coordinates of the second coordinate input satisfy the second coordinate condition, displaying an image of a second movement object so that the second movement object is located at the coordinates of the second coordinate input, and moving a position of the second movement object so that the second movement object is located at the coordinates of the second continuous coordinate input.

Based on the above, it is possible to urge the user to slowly perform a coordinate input operation on a second display.

Further, the display of the image indicating the input start possible point on the first display may include, if it is determined that the first coordinate input includes an input to the coordinates of the input start possible point, and when the coordinate input to the first display ceases to be detected before it is determined that the coordinates of the first continuous coordinate input satisfy the first coordinate condition, displaying the first movement object by moving the first movement object to the position including the coordinates of the input start possible point.

Based on the above, it is possible to notify the user that an operation for setting the positional relationship between the plurality of displays is not appropriately performed.

Further, an image of the second movement object may be the same image as an image of the first movement object.

Based on the above, it is possible to cause the user to grasp, in an easily understandable manner, a series of operations using the plurality of displays.

Further, the processor may be further configured to control the information processing system to erase the first movement object in accordance with a determination that the coordinates of the second coordinate input satisfy the second coordinate condition.

Based on the above, it is possible to make the image of the movement of a first movement object clearer.

Further, the display of the image indicating the input start possible point on the first display may include, if it is determined that the coordinates of the second coordinate input satisfy the second coordinate condition, and when the coordinate input to the second display ceases to be detected before it is determined that the coordinates of the second coordinate input includes an input to the coordinates of the input target point, displaying the first movement object at the position including the coordinates of the input start possible point.

Based on the above, it is possible to notify the user that an operation for setting the positional relationship between the plurality of displays is not appropriately performed.

Further, the determination of the positional relationship may include, if the coordinate input ceases to be detected by the second position detector in a state where the second continuous coordinate input includes the input to the position including the coordinates of the input target point, determining the positional relationship between the first display and the second display.

Based on the above, to set the positional relationship between the plurality of displays, it is possible to urge the user to perform a touch-off near an input target point.

Further, the information processing system may further include a third display and a third position detector configured to detect a coordinate input to the third display. The processor may be further configured to control the information processing system to: display, at a position including coordinates of an input target point on the third display, an image indicating the input target point on the third display; if the coordinates of the second continuous coordinate input pass through a position including the coordinates of the input target point on the second display and become coordinates of an edge portion of the second display, determine that a third coordinate condition is satisfied; and if it is determined that the second continuous coordinate input satisfies the third coordinate condition, and when a third coordinate input is detected by the third position detector after the second continuous coordinate input, and coordinates of the detected third coordinate input are coordinates of an edge portion of the third display, determine that the third coordinate input satisfies a fourth coordinate condition, the determination of whether or not the second continuous coordinate input includes the input to the position including the coordinates of the input target point may include, if it is determined that the third coordinate input satisfies the fourth coordinate condition, determining whether or not a third continuous coordinate input to the third display detected continuously from the third coordinate input includes an input to the position including coordinates of the input target point on the third display, and the determination of the positional relationship may include, if it is determined that the third continuous coordinate input includes the input to the position including the coordinates of the input target point on the third display, based on coordinates of the trajectory of the coordinates of the second continuous coordinate input and a trajectory of the third continuous coordinate input, setting a positional relationship between the second display and the third display.

Based on the above, it is possible to continuously set the positional relationships among three or more displays.

Further, the display of the image indicating the input start possible point on the first display may include placing, as the image indicating the input start possible point, an image of a first movement object at the position including the coordinates of the input start possible point, and if it is determined that the first coordinate input includes the input to the position including the coordinates of the input start possible point, moving a position of the first movement object so that the first movement object is located at the coordinates of the first continuous coordinate input, the display of the image indicating the input target point on the second display may include, if it is determined that the coordinates of the second coordinate input satisfy the second coordinate condition, displaying an image of a second movement object so that the second movement object is located at the coordinates of the second coordinate input, and moving a position of the second movement object so that the second movement object is located at the coordinates of the second continuous coordinate input, the display of the image indicating the input target point on the second display may include, if the second continuous coordinate input becomes the coordinates of the edge portion of the second display that are different from coordinates used to determine the second coordinate condition without including the input to the position including the coordinates of the input target point on the second display, erasing the second movement object, and the display of the image indicating the input start possible point on the first display may include, if the second continuous coordinate input becomes the coordinates of the edge portion of the second display that are different from the coordinates used to determine the second coordinate condition without including the input to the position including the coordinates of the input target point on the second display, displaying the first movement object by moving the first movement object to the position including the coordinates of the input start possible point.

Based on the above, it is possible to prevent the positional relationship from being set without providing a coordinate input to an input target point.

Further, the information processing system may further include a third display and a third position detector configured to detect a coordinate input to the third display. The display of the image indicating the input start possible point on the first display may include, if a positional relationship between the first display and the third display is to be further set after the positional relationship between the first display and the second display is set, displaying, at the position including coordinates of the input start possible point on the first display, the image indicating the input start possible point again.

Based on the above, when, it is possible to set the positional relationships among three or more displays by an additional operation.

Further, the information processing system may further include a third display and a third position detector configured to detect a coordinate input to the third display. The display of the image indicating the input target point on the second display may include, if a positional relationship between the second display and the third display is to be further set after the positional relationship between the first display and the second display is set, displaying, at a position including coordinates of an input start possible point on the second display, an image indicating the input start possible point.

Based on the above, it is possible to set the positional relationships among three or more displays by an additional operation.

Further, the display of the image indicating the input start possible point on the first display may include placing the image indicating the input start possible point in a center portion of the first display.

Based on the above, it is possible to ensure a space where a slide operation is performed. Thus, it is possible to accurately set the positional relationship.

The display of the image indicating the input target point on the second display may include placing the image indicating the input target point in a center portion of the second display.

Based on the above, it is possible to ensure a space where a slide operation is performed. Thus, it is possible to accurately set the positional relationship.

Further, the processor may be further configured to control the information processing system to, based on the positional relationship between the first display and the second display, perform display control so that a display content of the first display and a display content of the second display are continuous with each other.

Based on the above, it is possible to perform display based on the positional relationship between the plurality of displays.

Further, each of the first position detector and the second position detector may be a touch panel.

Based on the above, it is possible to set the positional relationship between the plurality of displays by a touch operation.

The exemplary embodiment may be carried out in the forms of an information processing apparatus, a storage medium having stored therein an information processing program, and an information processing method.

According to the exemplary embodiment, it is possible to notify a user in an easily understandable manner of an operation for setting the positional relationship between a plurality of displays.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 is a diagram illustrating a non-limiting example of the setting of the positional relationship between the two main body apparatuses 2;

FIG. 11 is a diagram showing a non-limiting example of an input object image Is and an input target image Ie for guiding a user through an operation for setting the positional relationship between a plurality of main body apparatuses 2;

FIG. 12 is a diagram showing a non-limiting example of the state where the input object image Is is moved by performing a touch operation on a first touch panel 13a;

FIG. 13 is a diagram showing a non-limiting example of the state where the input object image Is is moved by performing a touch operation on a second touch panel 13b;

FIG. 15 is a diagram showing a non-limiting example where three or more main body apparatuses 2 are placed in a placement form determined in advance, and the placement order of the three or more main body apparatuses 2 is set as the positional relationships;

FIG. 21 is a non-limiting example of a flow chart showing information processing executed by a game system 1 set as a parent apparatus;

DETAILED DESCRIPTION OF NON-LIMITING EXAMPLE EMBODIMENTS

A game system according to an exemplary embodiment is described below. An example of the game system 1 according to the exemplary embodiment includes a main body apparatus (an information processing apparatus; which functions as a game apparatus main body in the exemplary embodiment) 2, and a left controller 3 and a right controller 4 and functions also as an information processing system. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
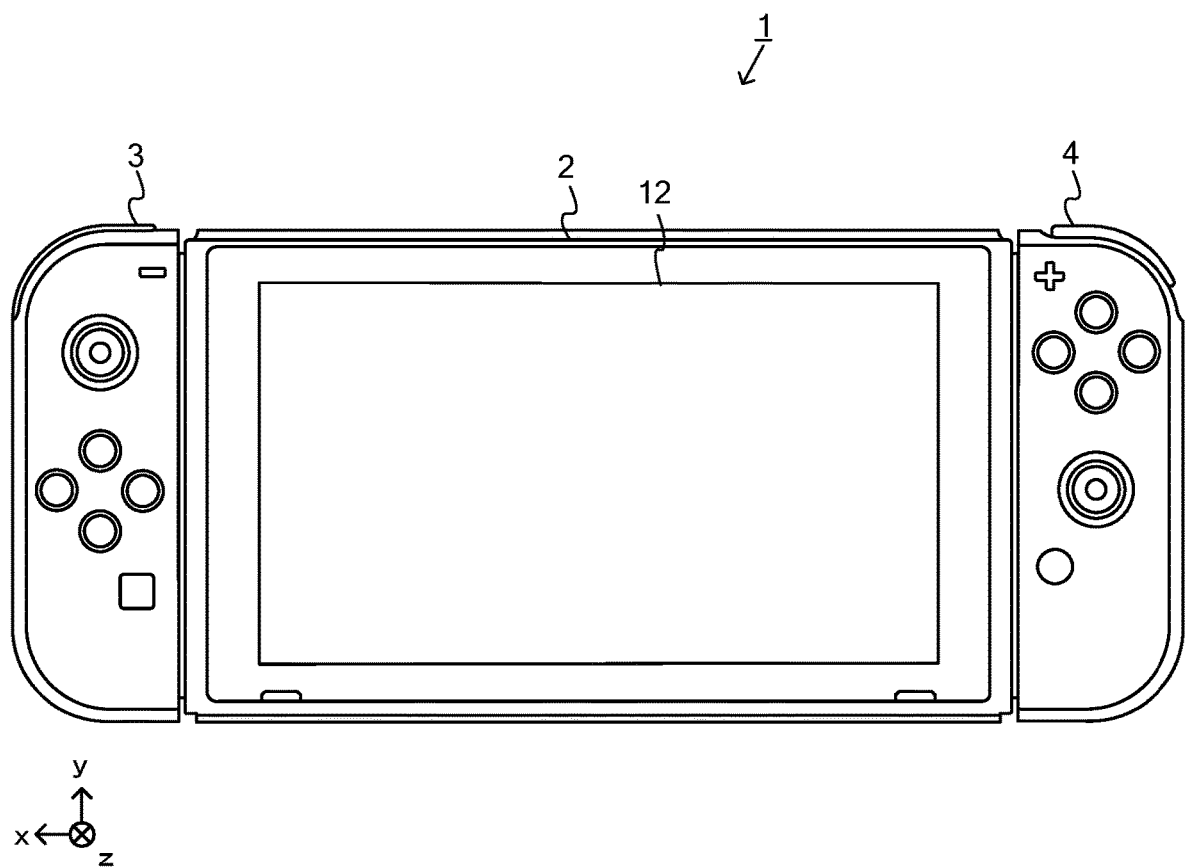
FIG. 1 is a diagram showing a non-limiting example of the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
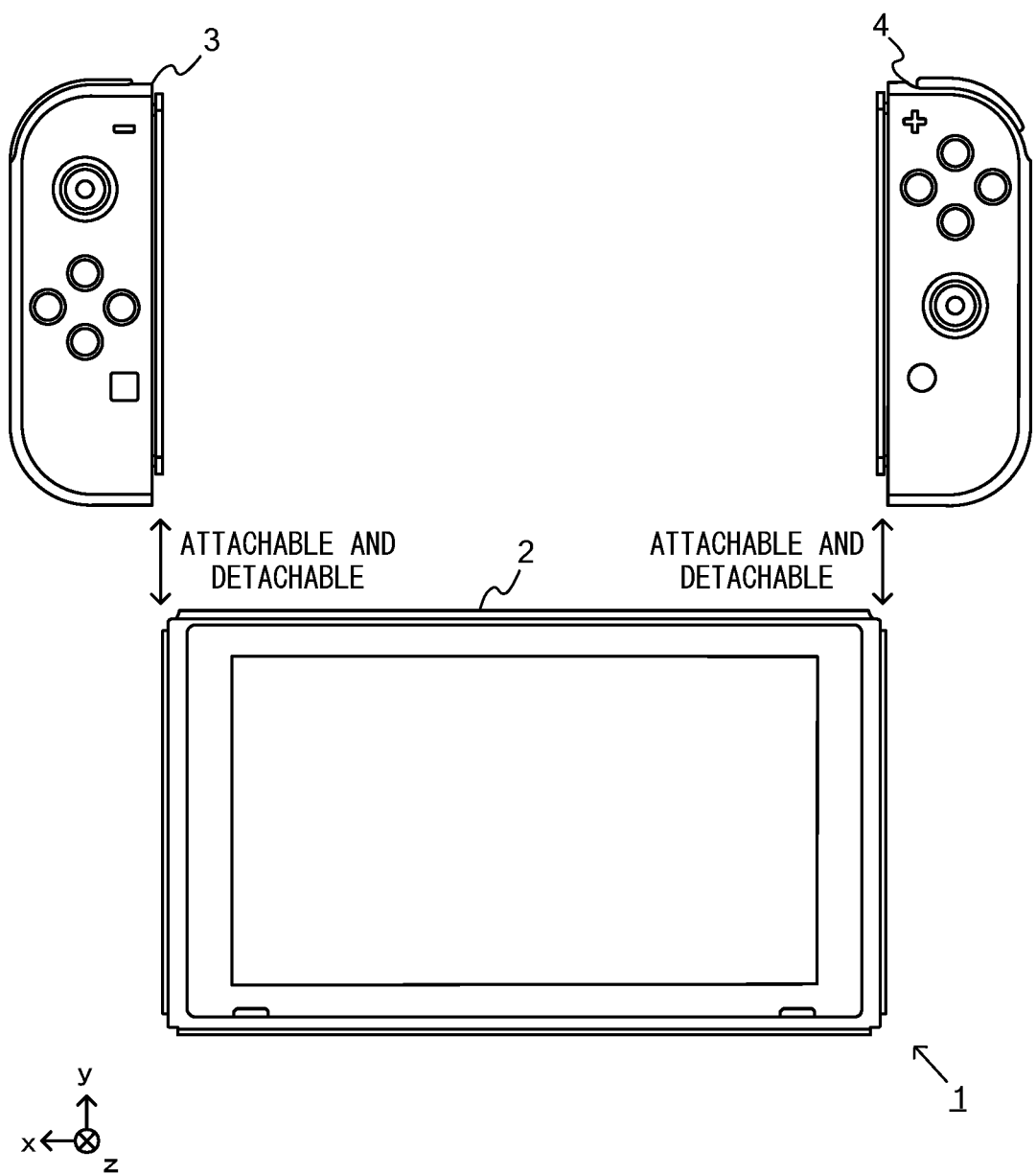
FIG. 2 is a diagram showing a non-limiting example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
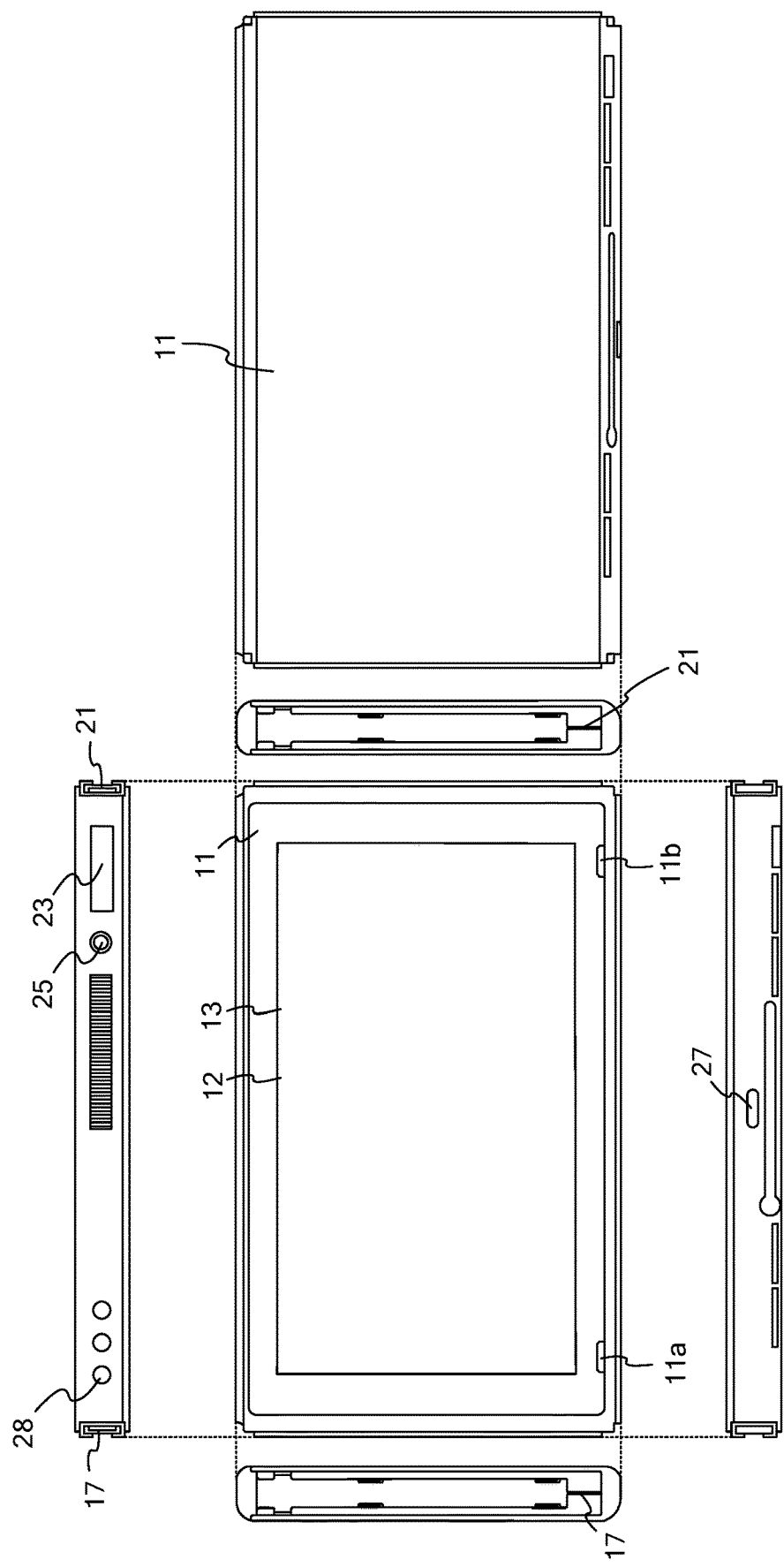
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
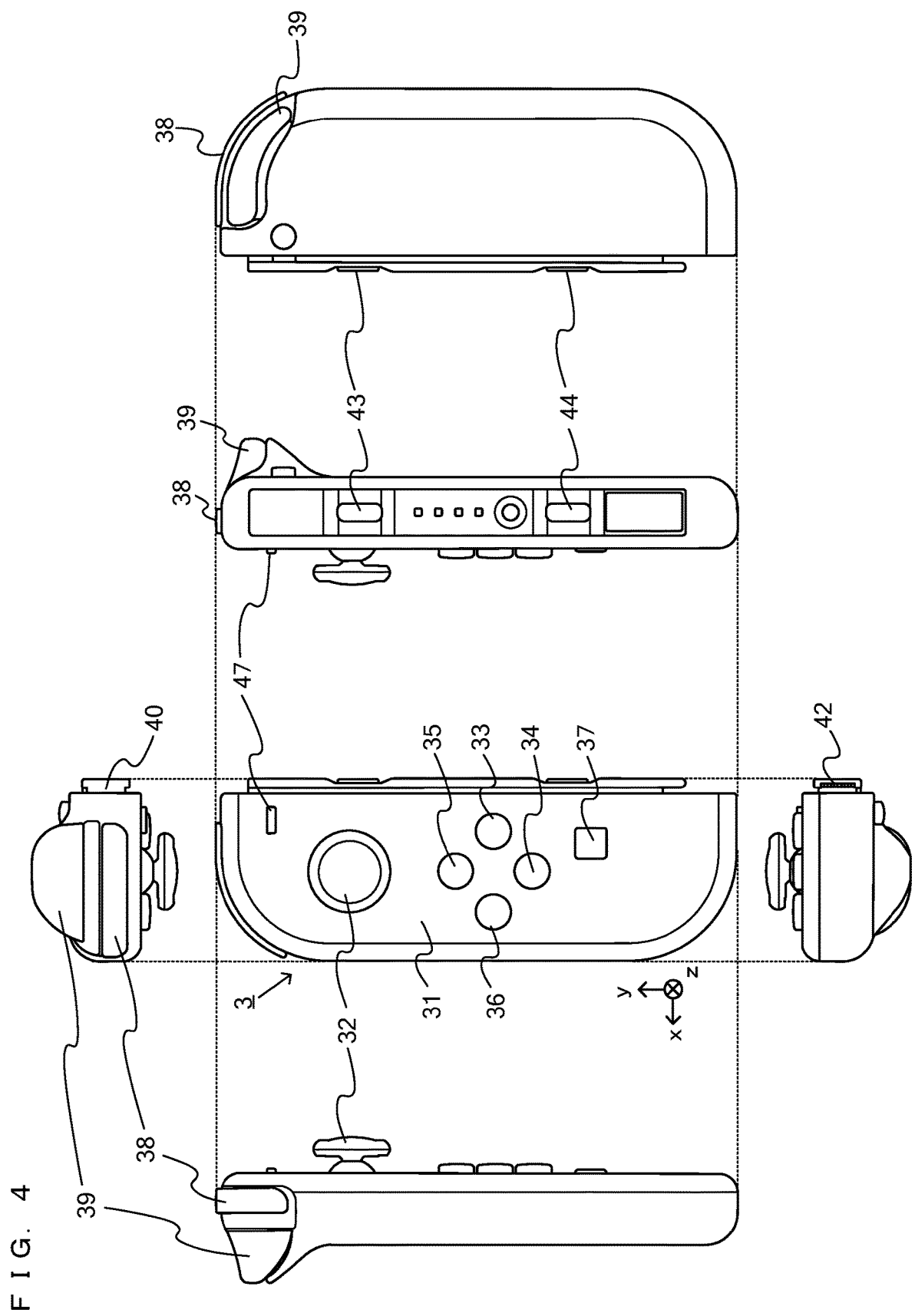
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
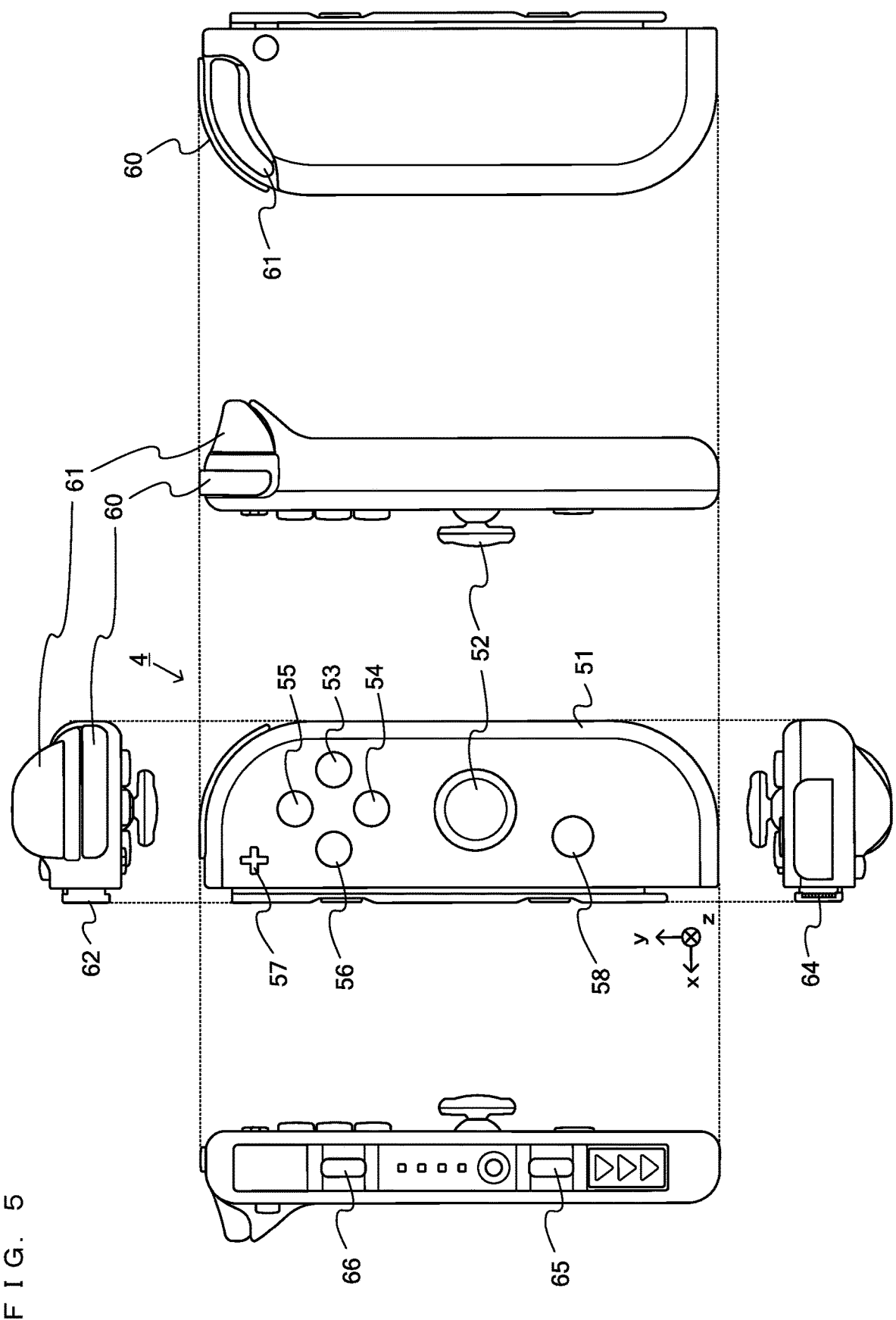
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
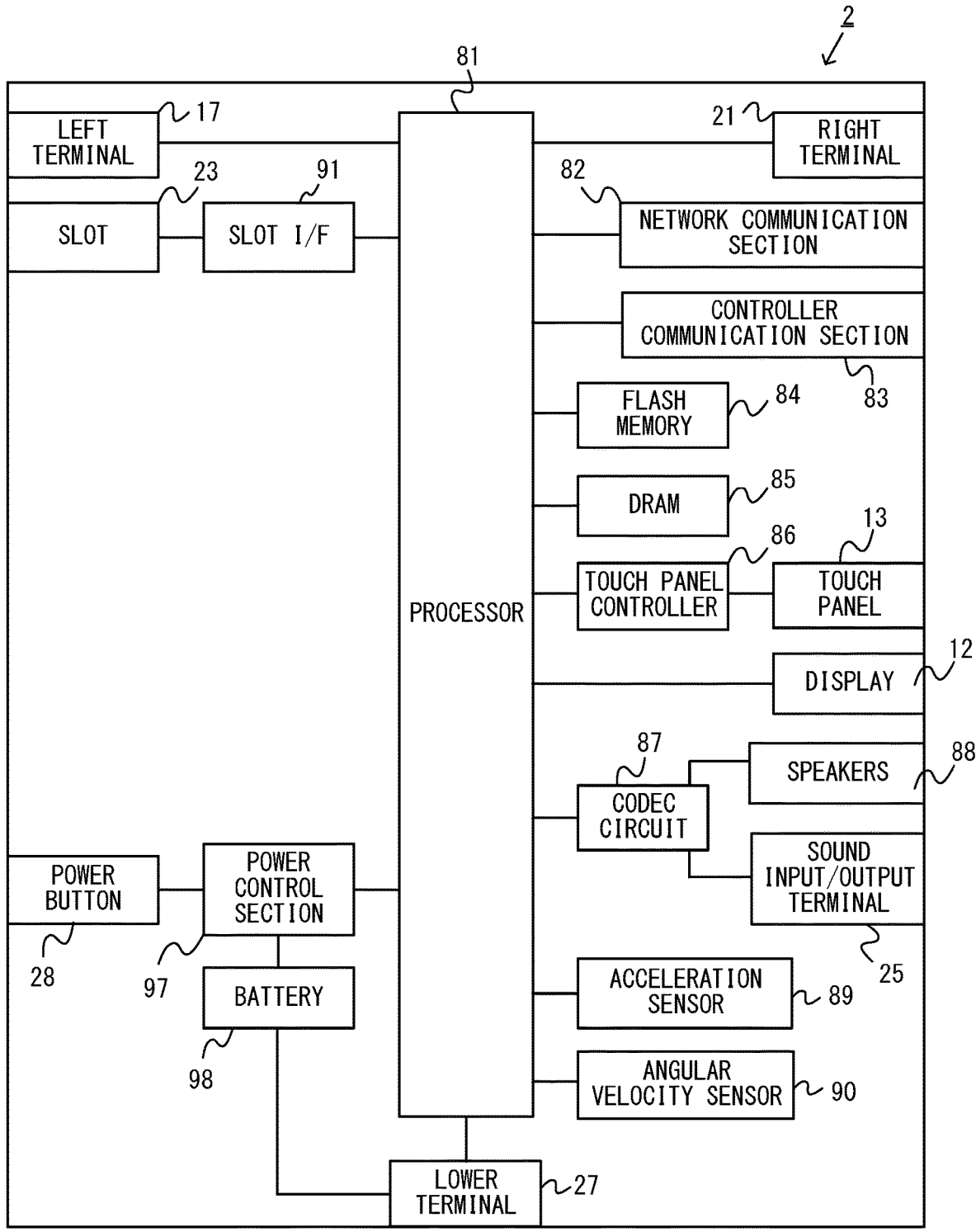
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot OF 91 is connected to the processor 81. The slot OF 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
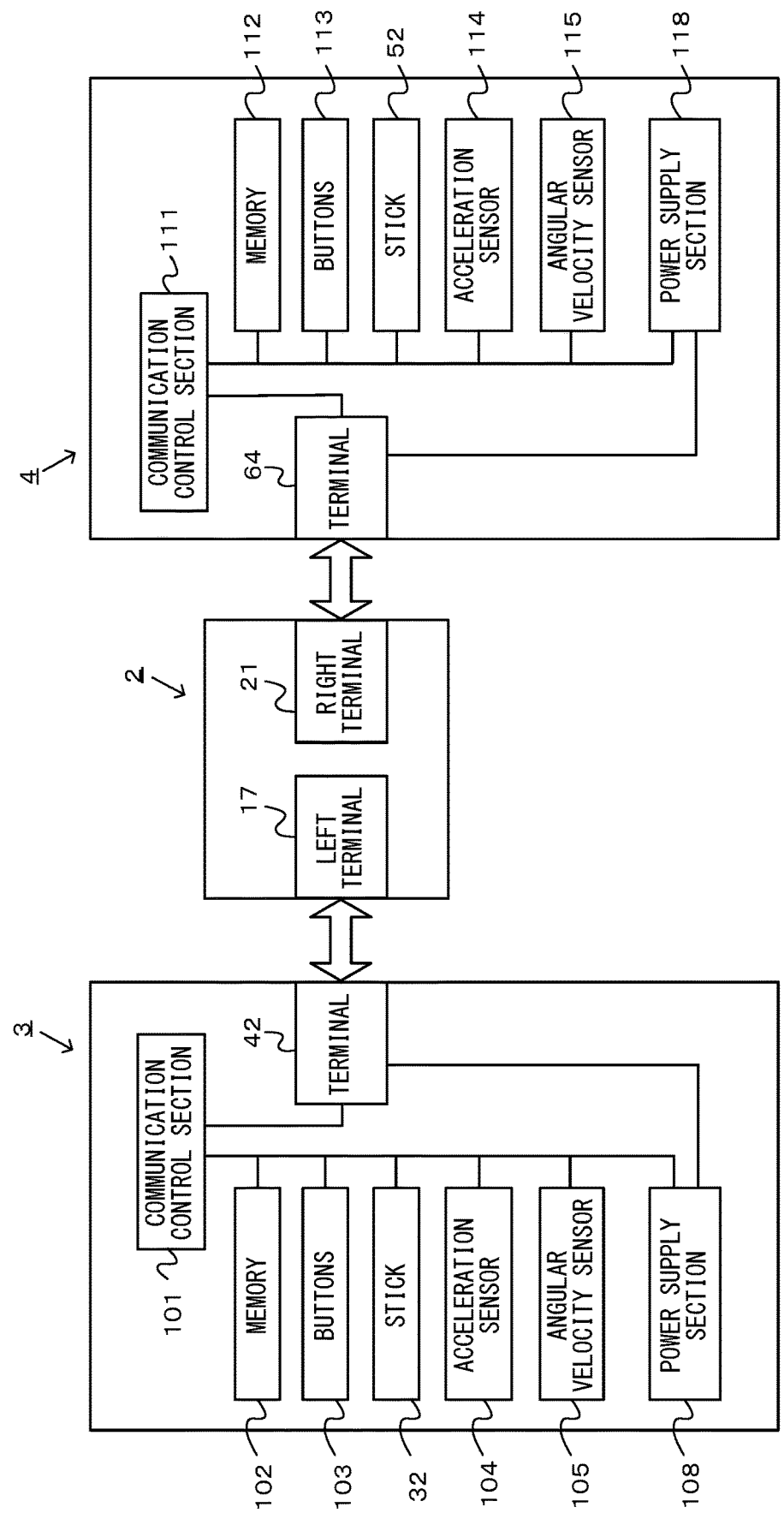
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a processing section 121. The processing section 121 is connected to the communication control section 111.

The right controller 4 includes a power supply section 118. The power supply section 118 has a function similar to that of the power supply section 108 of the left controller 3 and operates similarly to the power supply section 108.

As describe above, in the game system 1 according to the exemplary embodiment, the left controller 3 and the right controller 4 are attachable to and detachable from the main body apparatus 2. Further, the unified apparatus obtained by attaching the left controller 3 and the right controller 4 to the main body apparatus 2 or the main body apparatus 2 alone is attached to the cradle and thereby can output an image (and a sound) to the stationary monitor 6. A description is given below using a game system in a use form in which an image (and a sound) is output from the main body apparatus 2 in the state where the left controller 3 and the right controller 4 are detached from the main body apparatus 2.

In the exemplary embodiment, a plurality of main body apparatuses 2 in the state where the left controller 3 and the right controller 4 are detached (referred to as a "separate state") can be used. As a form in a case where an operation is performed on an application (e.g., a game application) using the game system 1 in the separate state, a form is possible in which two or more main body apparatuses 2 are placed next to each other, and two or more users each use the left controller 3 and/or the right controller 4.

Figure 8:
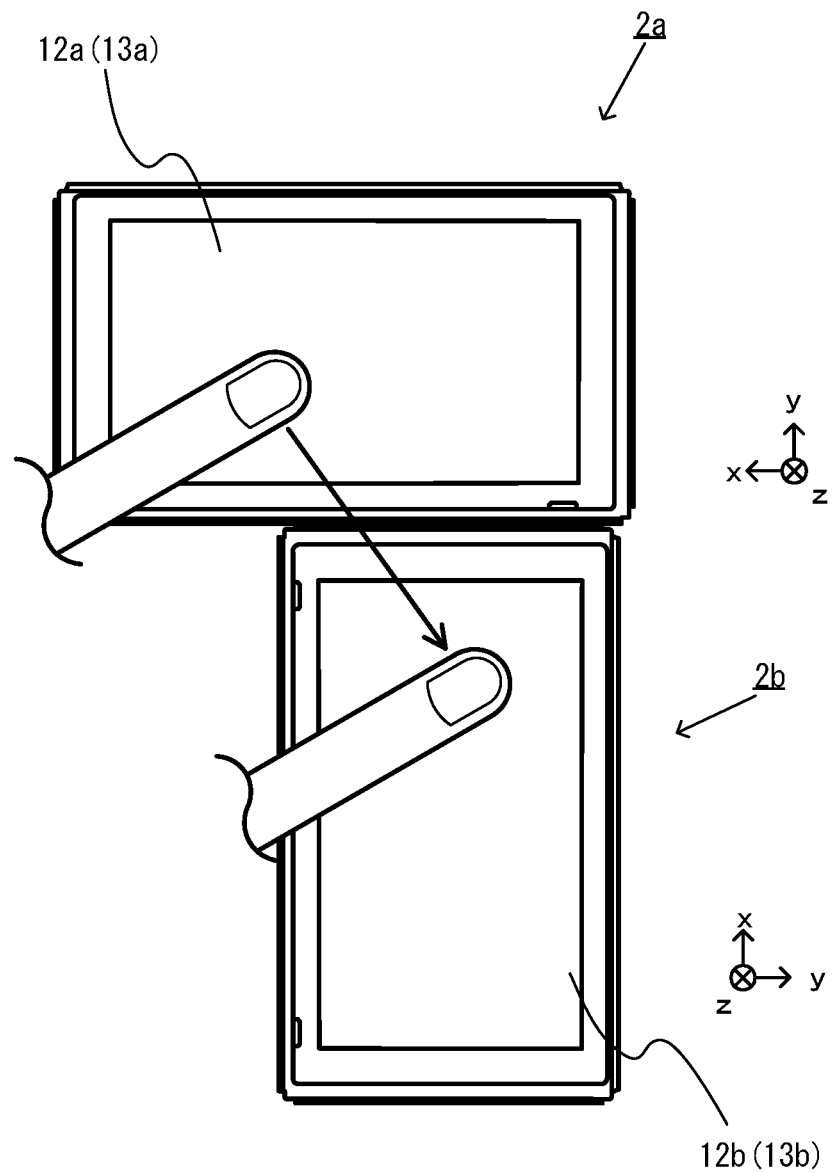
FIG. 8 is a diagram illustrating a non-limiting example of the setting of the positional relationship between two main body apparatuses 2.
Figure 10:
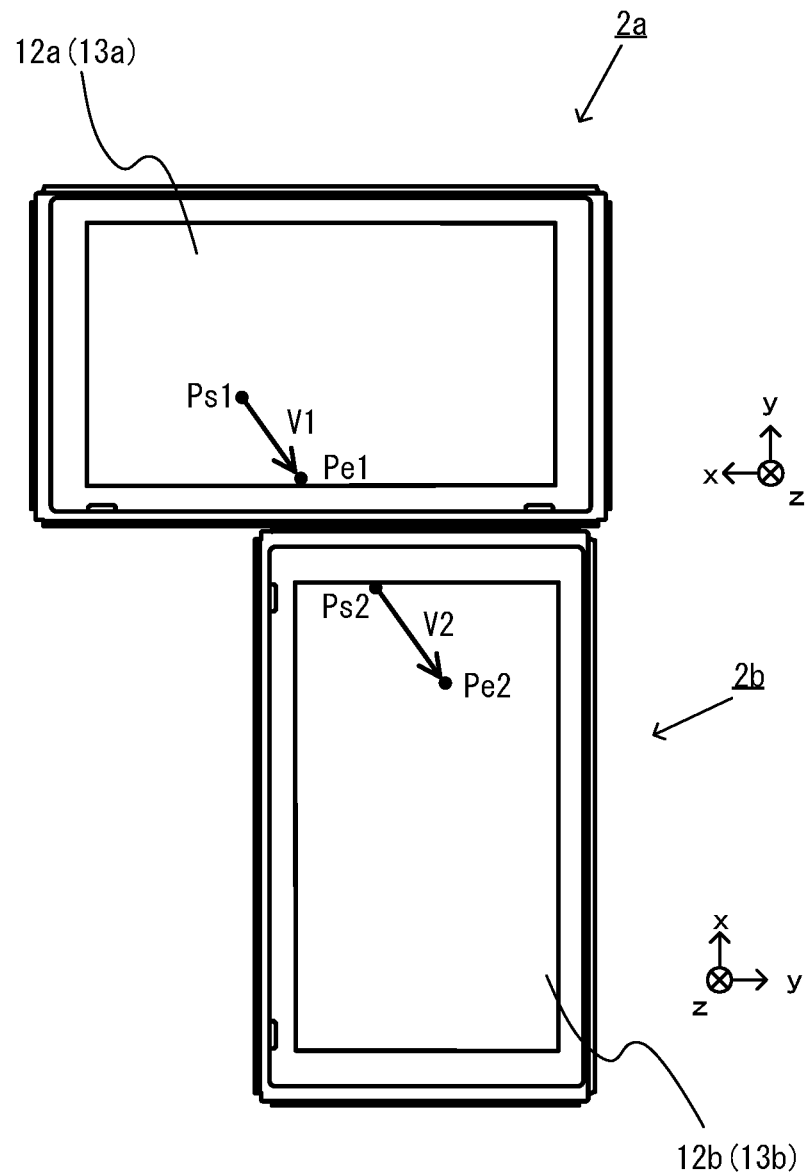
FIG. 10 is a diagram illustrating a non-limiting example of the setting of the positional relationship between the two main body apparatuses 2.

In the exemplary embodiment, the positional relationship between a plurality of main body apparatuses 2 placed next to each other is set, and based on this positional relationship, game processing is performed. To make the description specific, with reference to FIGS. 8 to 10, an example is described where using two main body apparatuses 2, the positional relationship between the two main body apparatuses 2 is set. FIGS. 8 to 10 are diagrams illustrating the setting of the positional relationship between the two main body apparatuses 2. Hereinafter, for convenience of description, the two main body apparatuses 2 are referred to as a "first main body apparatus 2a" and a "second main body apparatus 2b" and are in the state where the first main body apparatus 2a and the second main body apparatus 2b can communicate with each other. The display 12 and the touch panel 13 of the first main body apparatus 2a are referred to as a "first display 12a" and a "first touch panel 13a", respectively. The display 12 and the touch panel 13 of the second main body apparatus 2b are referred to as a "second display 12b" and a "second touch panel 13b", respectively.

An example is used where, as shown in FIG. 8, the first main body apparatus 2a and the second main body apparatus 2b are mounted at any positions so that the first display 12a (the first touch panel 13a) of the first main body apparatus 2a and the second display 12b (the second touch panel 13b) of the second main body apparatus 2b are adjacent to each other. The first main body apparatus 2a and the second main body apparatus 2b may be mounted as shown in FIG. 8 and then turned on. Then, to set the positional relationship between the first main body apparatus 2a and the second main body apparatus 2b, a user performs a touch-on on the touch panel 13 of either one of the main body apparatuses 2 (specifically, the touch panel 13 of one of the main body apparatuses 2 set as a parent apparatus when the main body apparatuses 2 communicate with each other; here, the first touch panel 13a of the first main body apparatus 2a), starts a touch operation, performs from this position the touch operation (a slide operation) for sliding onto the touch panel 13 of the other main body apparatus 2 (specifically, the touch panel 13 of one of the main body apparatuses 2 set as a child apparatus when the main body apparatuses 2 communicate with each other; here, the second touch panel 13b of the second main body apparatus 2b), and performs a touch-off.

Specifically, the user performs a touch-on at a position on the first touch panel 13a and then performs a slide operation to the periphery of the first touch panel 13a. Then, the user continues the slide operation to cross the gap between the first touch panel 13a and the second touch panel 13b, performs a touch operation on the periphery of the second touch panel 13b, then continues the slide operation from this position to a position on the second touch panel 13b, and performs a touch-off. This slide operation may be performed continuously and approximately along a straight line, or may be curved on the touch panels 13. In the following example, an example is used where the slide operation is performed approximately along a straight line. The starting point and the ending point of the slide operation performed on the first touch panel 13a are referred to as a "first starting point Ps1" and a "first ending point Pe1", respectively. The starting point and the ending point of the slide operation performed on the second touch panel 13b are referred to as a "second starting point Ps2" and a "second ending point Pe2", respectively. A description is given below of an example of the processing of the first main body apparatus 2a and the second main body apparatus 2b when this slide operation is performed.

Before the slide operation for setting the positional relationship is performed, the first main body apparatus 2a and the second main body apparatus 2b do not recognize the positional relationship with each other. Thus, as shown in FIG. 9, the above slide operation is detected by each of the first main body apparatus 2a and the second main body apparatus 2b without recognizing the positional relationship between the first main body apparatus 2a and the second main body apparatus 2b. First, if the user performs a touch-on on the first starting point Ps1 on the first touch panel 13a, the first touch panel 13a detects this touch-on operation. Consequently, a processor 81a of the first main body apparatus 2a determines that the slide operation is performed from the first touch panel 13a of the first main body apparatus 2a toward the second touch panel 13b of the second main body apparatus 2b.

If the user starts the slide operation from the first starting point Ps1, and the touch operation on the first touch panel 13a ends and a touch-off is performed at the first ending point Pe1, the slide operation on the first touch panel 13a ends. In the process of this slide operation, the coordinates of the touch operation performed on the first touch panel 13a are sequentially stored in the DRAM 85a of the first main body apparatus 2a. For example, while the touch operation is detected, the coordinates of the touch operation can be stored in each processing frame.

Next, if a touch-on is performed on the second starting point Ps2 on the second touch panel 13b, the time from when the touch-off is performed at the first ending point Pe1 to when the touch-on is performed at the second starting point Ps2 (a non-touch time t1) is calculated. Then, if the user starts the slide operation again from the second starting point Ps2 and performs a touch-off from the second touch panel 13b at the second ending point Pe2, the slide operation for setting the positional relationship ends. During this slide operation from the second starting point Ps2 to the second ending point Pe2 on the second touch panel 13b, the coordinates of the touch operation performed on the second touch panel 13b are sequentially stored in the DRAM 85b of the second main body apparatus 2b.

After the above slide operation ends, to set the positional relationship between the first main body apparatus 2a and the second main body apparatus 2b, the processor 81a of the first main body apparatus 2a calculates a first vector V1 from the first starting point Ps1 to the first ending point Pe1 based on the coordinates of the touch operation performed on first touch panel 13a as shown in FIG. 9. Similarly, a processor 81b of the second main body apparatus 2b also calculates a second vector V2 from the second starting point Ps2 to the second ending point Pe2. Then, using the first vector V1, the second vector V2, and the non-touch time t1, the positional relationship between the first touch panel 13a (the first display 12a) and the second touch panel 13b (the second display 12b) is set. That is, as shown in FIG. 10, the positional relationship between the first touch panel 13a (the first display 12a) and the second touch panel 13b (the second display 12b) is set so that the first vector V1 and the second vector V2 are placed next to each other on a straight line in accordance with time with which the first vector V1 and the second vector V2 are recorded. The first vector V1, the second vector V2, and the non-touch time t1 calculated after the slide operation are cross-referenced by the first main body apparatus 2a and the second main body apparatus 2b, and the positional relationship is calculated by at least one of the first main body apparatus 2a and the second main body apparatus 2b (typically, the first main body apparatus 2a set as the parent apparatus). Then, this positional relationship is cross-referenced by the first main body apparatus 2a and the second main body apparatus 2b.

Specifically, this positional relationship is obtained by, for example, defining the coordinates on the first touch panel 13a and the second touch panel 13b (the positions of pixels on the first display 12a and the second display 12b) of the first main body apparatus 2a and the second main body apparatus 2b installed at positions shown in FIG. 8, in a global coordinate space defined by a virtual game space. Consequently, the positions of pixels on the first display 12a and the second display 12b become known, and therefore, images corresponding to the placement positions of the first main body apparatus 2a and the second main body apparatus 2b can be displayed on the first display 12a and the second display 12b, and the virtual game space can be displayed on two displays, i.e., the first display 12a and the second display 12b. Then, when a game is performed, after the positional relationship is set, predetermined game processing based on this positional relationship is performed, and based on the game processing, the virtual game space is displayed on two displays, i.e., the first display 12a and the second display 12b.

Regarding the setting of the positions of the first display 12a and the second display 12b in the above global coordinate space, since the sizes of and the coordinates on the first touch panel 13a and the second touch panel 13b and the first display 12a and the second display 12b of the first main body apparatus 2a and the second main body apparatus 2b are known, if the first vector V1 and the second vector V2 are calculated, the angle between the first touch panel 13a and the second touch panel 13b is calculated. If the velocity of the slide operation and the non-touch time t1 are calculated, the distance between the first ending point Pe1 and the second starting point Ps2 can be calculated, and therefore, the distance between the first touch panel 13a and the second touch panel 13b can be calculated. Based on the calculated angle and distance, the coordinates on the second touch panel 13b in the coordinate system of the first touch panel 13a can be calculated. Then, if the position and the angle (the orientation) of the first touch panel 13a in the global coordinate space are set in advance, the coordinates on the second touch panel 13b can also be represented by global coordinates. Further, since the coordinates on the first touch panel 13a and the second touch panel 13b and the positions (the coordinates) of pixels on the first display 12a and the second display 12b approximately coincide with each other, the coordinates on the first display 12a and the second display 12b can be represented by global coordinates. As a result, images corresponding to the placement positions of the first main body apparatus 2a and the second main body apparatus 2b can be displayed on the first display 12a and the second display 12b.

The number of samples for calculating the above vectors on the first display 12a and the second display 12b can be determined in advance. For example, the number of frames (times) a touch operation is performed on the first touch panel 13a is calculated, and further, the number of frames a touch operation is performed on the second touch panel 13b is calculated. Then, if either number of frames is less than a predetermined number of frames (e.g., 15 frames), the above vectors are not calculated (an error is determined), whereby the above positional relationship is not set. If the required number of frames (the non-touch time t1) or the required time from the first ending point Pe1 to the second starting point Ps2 exceeds a predetermined number of frames (e.g., 80 frames) or a predetermined time (e.g., 0.3 seconds), it may be determined that the slide operation from the first touch panel 13a to the second touch panel 13b is not continuous (an error may be determined), and the positional relationship may not be set.

The vectors used for the above setting of the positions may be set based on another condition. For example, in a slide operation from a touch-on at a position on the first touch panel 13a to the periphery of the first touch panel 13a, a vector from a single point in the trajectory of the slide operation (i.e., the trajectory from the first starting point Ps1 to the first ending point Pe1) to a touch position at the periphery (i.e., the first ending point Pe1) may be set as the first vector V1. As an example, a point in the trajectory may be a touch position on the trajectory obtained predetermined frames before the time when the touch position at the periphery is obtained. In a slide operation from the periphery of the second touch panel 13b to a touch-off, a vector from a touch position at the periphery (i.e., the second starting point Ps2) to a single point in the trajectory of the slide operation (i.e., the trajectory from the second starting point Ps2 to the second ending point Pe2) may be set as the second vector V2. As an example, a point in the trajectory may be a touch position on the trajectory obtained predetermined frames after the time when the touch position at the periphery is obtained.

Between the plurality of main body apparatuses 2 between which the positional relationship is set, a void may be formed. For example, the distance between the first ending point Pe1 and the second starting point Ps2 is calculated from the velocity of the slide operation in which the first vector V1 and the second vector V2 are generated, and the non-touch time t1, and a void corresponding to the calculated distance is set between the first touch panel 13a and the second touch panel 13b. That is, the positional relationship between the first touch panel 13a and the second touch panel 13b is set so that the first vector V1 and the second vector V2 are placed next to each other on the same straight line with the above distance between the first vector V1 and the second vector V2.

The velocity of the slide operation used here is not particularly limited. Any velocity of the slide operation from the first starting point Ps1 to the second ending point Pe2 may be used. For example, the average velocity of the slide operation on the first touch panel 13a may be used, or the average velocity of the slide operation on the second touch panel 13b may be used. Alternatively, the average velocity of the entire slide operation from the first touch panel 13a to the second touch panel 13b can also be used. Yet alternatively, the partial velocity or the average velocity of the slide operation on each touch panel can also be used.

In the above exemplary embodiment, an example has been shown where the positional relationship is set in a case where the first main body apparatus 2a (the first touch panel 13a) and the second main body apparatus 2b (the second touch panel 13b) are placed on the same two-dimensional plane. However, in a case where at least one of the first main body apparatus 2a and the second main body apparatus 2b is placed three-dimensionally tilted, and the first main body apparatus 2a and the second main body apparatus 2b three-dimensionally intersect each other, based on the orientations detected by the inertial sensors (the acceleration sensors 89 and/or the angular velocity sensors 90), the positional relationship between the first main body apparatus 2a and the second main body apparatus 2b may be set taking into account the tilt based on the intersection. Specifically, the coordinates on the first display 12a and the second display 12b can be represented by three-dimensional global coordinates.

Figure 12:
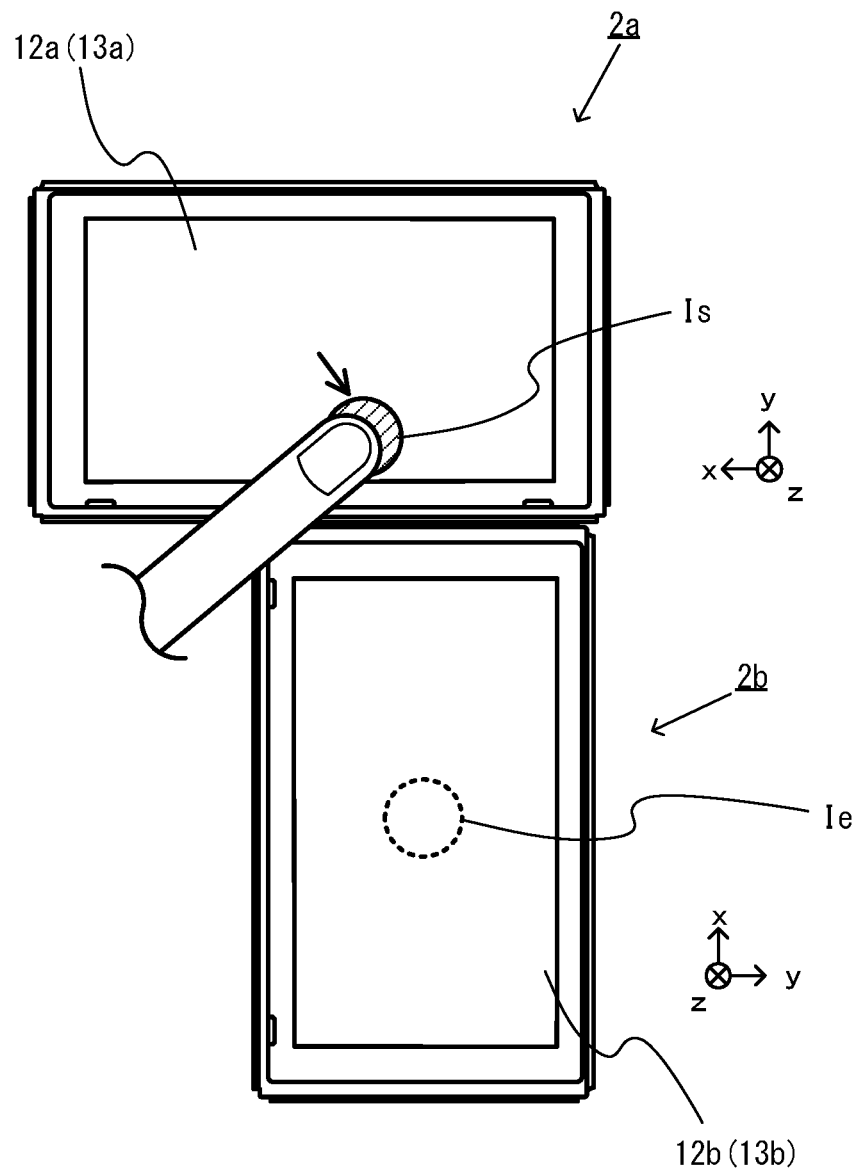
Figure 14:
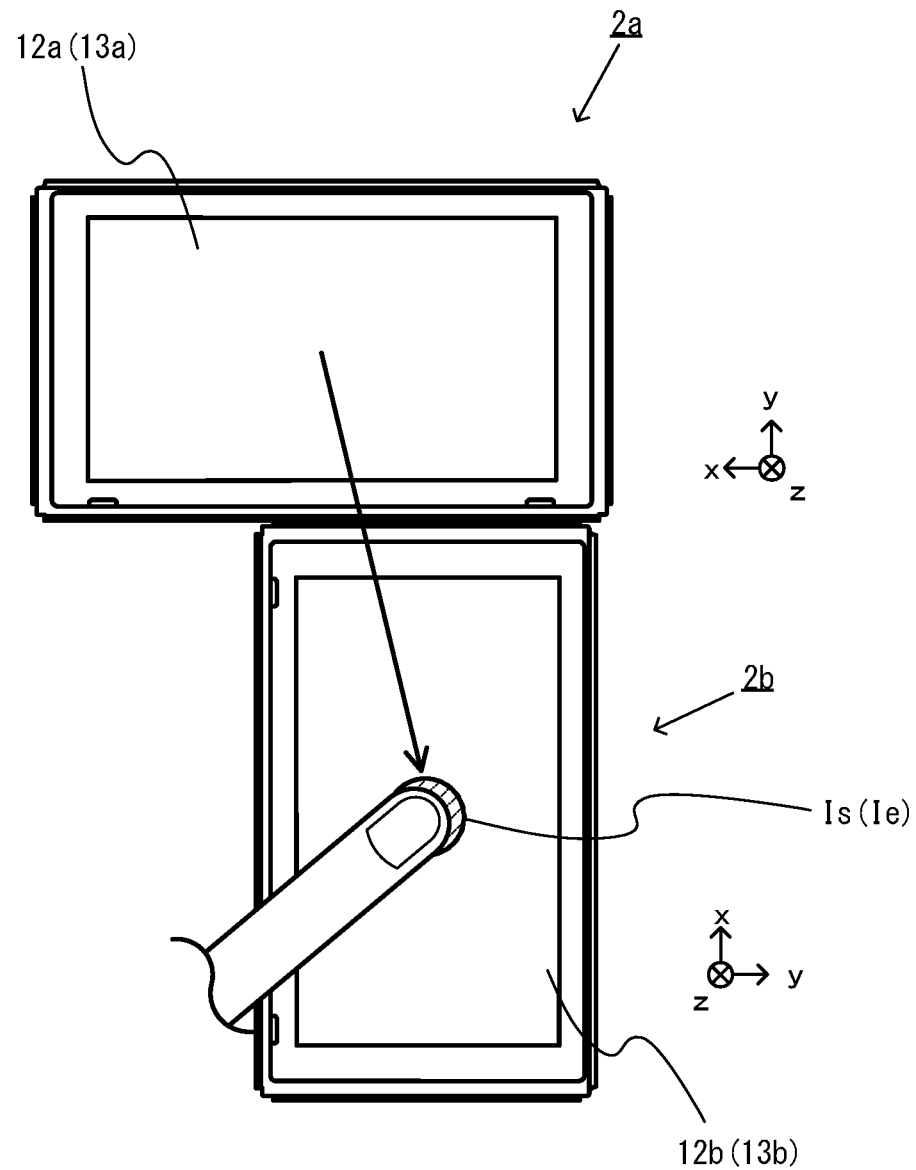
FIG. 14 is a diagram showing a non-limiting example of the state where the input object image Is is moved to a position indicated by an input target image Ie.

In the exemplary embodiment, an image for guiding the user through an operation for setting the positional relationship between the plurality of main body apparatuses 2 placed next to each other is displayed on the display 12 of each of the main body apparatuses 2. With reference to FIGS. 11 to 14, a description is given below of an example where an operation for setting the positional relationship between two main body apparatuses 2 is performed using the above images. FIG. 11 is a diagram showing examples of an input object image Is and an input target image Ie for guiding the user through the operation for setting the positional relationship between the plurality of main body apparatuses 2. FIG. 12 is a diagram showing an example of the state where the input object image Is is moved by performing a touch operation on the first touch panel 13a. FIG. 13 is a diagram showing an example of the state where the input object image Is is moved by performing a touch operation on the second touch panel 13b. FIG. 14 is a diagram showing an example of the state where the input object image Is is moved to a position indicated by the input target image Ie. Hereinafter, for convenience of description, similarly to the above, the two main body apparatuses 2 are referred to as a "first main body apparatus 2a" and a "second main body apparatus 2h" and are in the state where the first main body apparatus 2a and the second main body apparatus 2b can communicate with each other. The display 12 and the touch panel 13 of the first main body apparatus 2a are referred to as a "first display 12a" and a first touch panel 13a", respectively. The display 12 and the touch panel 13 of the second main body apparatus 2b are referred to as a "second display 12b" and a "second touch panel 13b", respectively.

In FIG. 11, the first main body apparatus 2a and the second main body apparatus 2b are in the state where the first main body apparatus 2a and the second main body apparatus 2b can communicate with each other. In this communication process, the first main body apparatus 2a is set as a parent apparatus, and the second main body apparatus 2b is set as a child apparatus. In this case, in the state before the process of setting the positional relationship is performed, on the first display 12a of the first main body apparatus 2a set as the parent apparatus, an input object image Is is displayed at a position including the coordinates of an input start possible point on the first display 12a (e.g., a position including the center of the screen). In the state before the process of setting the positional relationship is performed, on the second display 12b of the second main body apparatus 2b set as the child apparatus, an input target image Ie is displayed at a position including the coordinates of an input target point on the second display 12b (e.g., a position including the center of the screen). For example, the input object image Is is an image represented by a circular object such as a coin. Then, the input target image Ie is a figure of the same shape as the input object image Is and is displayed in the same size as, a slightly larger size than, or a slightly smaller size than the outer edge of the input object image Is.

In FIG. 12, if the user performs a touch-on on the first touch panel 13a from a position on the input object image Is displayed on the first display 12a and then performs a touch operation for sliding (a slide operation), the input object image Is moves to a position that coincides with a touch position in the slide operation. Consequently, the input object image Is displayed on the first display 12a makes a drag movement by the slide operation on the first touch panel 13a. Then, after performing the touch-on on the position on the first touch panel 13a, the user performs the slide operation toward the second main body apparatus 2b of which the position is to be set, so that the input object image Is makes a drag movement to the periphery of the first touch panel 13a. In the above description, an example of an operation for performing a touch-on on the first touch panel 13a from a position on the input object image Is is used. Alternatively, the input object image Is may be displayed at a position in the middle of performing a touch-on at a position other than the input object image Is on the first touch panel 13a and performing a slide operation. In this case, the input object image Is may start making a drag movement from the time when the position where the above slide operation is performed and the position of the input object image Is overlap each other.

In FIG. 13, the user performs the slide operation to the periphery of the first touch panel 13a toward the second main body apparatus 2b, then continues the slide operation to cross the gap between the first touch panel 13a and the second touch panel 13b, and performs an operation for starting a touch operation from the periphery of the second touch panel 13b (see an arrow shown in FIG. 13). By the slide operation from the first touch panel 13a to the second touch panel 13b, this slide operation becomes an operation for performing a touch-off once at a peripheral portion of the first touch panel 13a and performing a touch-on again at a peripheral portion of the second touch panel 13b. By this slide operation, the input object image Is displayed while making a drag movement on the first display 12a is erased once at the peripheral portion of the first touch panel 13a where the touch-off is performed. Then, the input object image Is is displayed again on the second display 12b from the peripheral portion of the second touch panel 13b where the touch-on is performed. Then, the slide operation is continued from the peripheral portion on the second touch panel 13b, whereby the input object image Is makes a drag movement in accordance with the slide operation on the second touch panel 13b from the peripheral portion and is displayed on the second display 12b. The timing when the input object image Is is erased once at the peripheral portion of the first touch panel 13a may be the timing when the touch-off is performed at the peripheral portion, or may be the timing when the touch-on is performed at the peripheral portion of the second touch panel 13b. As another example, even after the slide operation on the second touch panel 13b is started, separately from the input object image Is displayed on the second display 12b, the display of the input object image Is may be continued at the peripheral portion where the touch-off is performed from the first touch panel 13a. It is preferable that the input object image Is displayed on the first display 12a should be the same as the input object image Is displayed on the second display 12b as a displayed image. However, as the internal processing of each of the first main body apparatus 2a and the second main body apparatus 2b, not the same image object, but different image objects having the same appearance are used. The handling of such image objects in the internal processing is similar in a case where processing is performed by another main body apparatus 2.

As shown in FIG. 14, if the above slide operation on the second touch panel 13b is performed to the position where the input target image Ie is displayed on the second display 12b, and a touch-off is performed from the second touch panel 13b at a position on the input target image Ie, the operation for setting the positional relationship between the first main body apparatus 2a and the second main body apparatus 2b ends. Then, based on the touch position as a trajectory on the first touch panel 13a and the second touch panel 13b obtained by the above slide operation, the positional relationship between the first main body apparatus 2a and the second main body apparatus 2b is set. If the above positional relationship is set, the input object image Is and the input target image Ie displayed on the second display 12b are erased, and images based on the positional relationship are displayed on the first display 12a and the second display 12b.

In the exemplary embodiment, if an inappropriate operation is performed in the middle of the above slide operation, the inappropriate operation is treated as an operation error, and the process for setting the positional relationship between the main body apparatuses 2 is performed again, and it is indicated to the user that an operation error occurs. As an example, if the above operation error occurs, the position where the input object image Is is displayed is returned to the initial position, i.e., the position including the coordinates of the input start possible point on the first display 12a (e.g., the position including the center of the screen), thereby indicating to the user that the operation error occurs. Here, in any case where it can be determined that the operation for setting the positional relationship between the main body apparatuses 2 is inappropriate, it may be determined that an operation error occurs. For example, it may be determined that an operation error occurs in a case where the time in which the slide operation is continued to cross the gap between the touch panels 13 (a non-touch time) reaches a predetermined time, a case where the moving velocity of the touch position of the slide operation performed on the touch panels 13 exceeds a predetermined velocity, a case where a touch-off is performed before the position of the slide operation reaches a position overlapping the input target image displayed on the display 12, a case where, before the positional relationship between the main body apparatuses 2 is set, a touch operation is performed by the above slide operation on the touch panel 13 of another main body apparatus 2 capable of performing wireless communication, or the like. The display form of the indication to the user that an operation error occurs may not be based on the position where the input object image Is is displayed. For example, the user may be informed by a text image, a sound, or the like that an error occurs in the slide operation.

In the above description, an example has been used where the input object image Is and the input target image Ie are displayed, thereby guiding the user through the operation for setting the positional relationship between the plurality of main body apparatuses 2 placed next to each other. Alternatively, this guiding may be performed using other images. For example, predetermined images (e.g., images of "x" marks) may be displayed at the input start possible position and the input target position, thereby urging the user to perform a slide operation to connect the predetermined images. Alternatively, the trajectory of the above slide operation may be displayed as a line image, and if the slide operation is not completed by, for example, performing a touch-off in the middle of the slide operation and an error occurs in the middle, the line image may be erased, thereby urging the user to correctly perform the slide operation. The input object image Is may not be a circular object such as a coin, and may be an image representing a polygon, a character image, or an image representing a solid such as a sphere.

In the above description, each of the input start possible position and the input target position is set at the center of the display 12. Consequently, space for performing a slide operation on a plurality of touch panels 13 can be secured no matter what placement relationship the touch panels 13 are mounted in. Thus, it is possible to accurately determine the positional relationship. If such an effect is not desired, at least one of the input start possible position and the input target position may not be set at the center of the display 12. Although it is apparent from other descriptions, in the operation for setting the positional relationship between the plurality of main body apparatuses 2, a touch-on may not be performed from the input start possible position set in advance, and a touch-off may be performed at the input target position set in advance. For example, even if, in the middle of a slide operation, the slide operation passes through the input start possible position set in advance or the input target position set in advance, the slide operation may be established as the operation for setting the positional relationship between the plurality of main body apparatuses 2. As a matter of course, the operation for setting the positional relationship between the plurality of main body apparatuses 2 may be established by performing a touch-on from the input start possible position set in advance and performing a touch-off at the input target position set in advance.

In the above exemplary embodiment, an example of the display of images guiding the user through an operation for calculating the positional relationship between two main body apparatuses 2 capable of communicating with each other is shown. However, the positional relationships among three or more main body apparatuses 2 capable of communicating with each other can also be calculated. Then, as an example, with reference to FIG. 15, a description is given using an example where three or more main body apparatuses 2 are placed in a placement form determined in advance, and the placement order of the three or more main body apparatuses 2 is set as the positional relationships. As another example, with reference to FIGS. 16 and 17, an example is used where three or more main body apparatuses 2 are placed in any placement form, and the positional relationships among the three or more main body apparatuses 2 are set.

In an example shown in FIG. 15, four main body apparatuses 2 (a first main body apparatus 2a, a second main body apparatus 2b, a third main body apparatus 2c, and a fourth main body apparatus 2d) are placed in a placement form determined in advance, and the placement order of the four main body apparatuses 2 is set as the positional relationships. Here, the placement form determined in advance refers to the mounting of the plurality of main body apparatuses 2 in a placement shape specified in advance, such as a placement in which the plurality of main body apparatuses 2 are arranged horizontally in a line, a placement in which the plurality of main body apparatuses 2 are arranged vertically in a line, a placement in which the plurality of main body apparatuses 2 are arranged in a grid (e.g., a two-by-two matrix shape), a placement in which the plurality of main body apparatuses 2 are arranged in an L-shape, or a placement in which the plurality of main body apparatuses 2 are arranged in a loop (e.g., a square shape). For example, in the example shown in FIG. 15, an example is used where the first main body apparatus 2a, the second main body apparatus 2b, the third main body apparatus 2c, and the fourth main body apparatus 2d are placed next to each other horizontally in a line, and this placement order is set as the positional relationships.

In (a) of FIG. 15, the first main body apparatus 2a, the second main body apparatus 2b, the third main body apparatus 2c, and the fourth main body apparatus 2d capable of communicating with each other are mounted next to each other horizontally in a line in the left-right direction by the user so that the left-right direction of each main body apparatus is its long axis direction. Here, the first main body apparatus 2a is set as a parent apparatus in the above communication and placed at an end (the left end or the right end) in the above placement order of the placement made horizontally in a line in the left-right direction. Then, the placement order of the other main body apparatuses, i.e., the second main body apparatus 2b, the third main body apparatus 2c, and the fourth main body apparatus 2d, are optional.

In the state before the process of setting the positional relationships is performed, on a first display 12a of the first main body apparatus 2a set as the parent apparatus among the plurality of main body apparatuses 2 placed horizontally in a line in the left-right direction, an input object image Is is displayed at a position including the coordinates of an input start possible point on the first display 12*a* (e.g., a position including the center of the screen). In the state before the process of setting the positional relationships is performed, on a second display 12*b*, a third display 12*c*, and a fourth display 12*d* of the second main body apparatus 2*b*, the third main body apparatus 2*c*, and the fourth main body apparatus 2*d* set as child apparatuses, input target images Ieb, Iec, and Ied, respectively, are displayed at positions including the coordinates of input target points (e.g., positions including the centers of the screens).

In (b) of FIG. 15, the user performs a touch-on on a first touch panel 13*a* from a position on the input object image Is displayed on the first display 12*a* and then performs a slide operation to another one of the main body apparatuses 2 adjacent to the main body apparatus 2*a* (in the example of FIG. 15, the second main body apparatus 2*b*), whereby the input object image Is makes a drag movement in accordance with the slide operation. Then, the user performs the slide operation to the periphery of the first touch panel 13*a* toward the second main body apparatus 2*b* adjacent to the main body apparatus 2*a*, then continues the slide operation to cross the gap between the first touch panel 13*a* and a second touch panel 13*b*, and performs an operation for starting a touch operation from the periphery of the second touch panel 13*b* (see an arrow shown in (b) of FIG. 15). By this slide operation, the input object image Is displayed while making a drag movement on the first display 12*a* is erased once at a peripheral portion of the first touch panel 13*a* where a touch-off is performed. Then, the input object image Is is displayed again on the second display 12*b* from a peripheral portion of the second touch panel 13*b* where a touch-on is performed. Then, the slide operation is continued from the peripheral portion on the second touch panel 13*b*, whereby the input object image Is makes a drag movement in accordance with the slide operation on the second touch panel 13*b* from the peripheral portion and is displayed on the second display 12*b*.

In (c) of FIG. 15, if the above slide operation on the second touch panel 13*b* is performed to the position where the input target image Ieb is displayed on the second display 12*b*, and a touch-off is performed from the second touch panel 13*b* at a position on the input target image Ieb, based on a touch position as a trajectory on the first touch panel 13*a* and the second touch panel 13*b* obtained by the above slide operation, a positional relationship is set such that the second main body apparatus 2*b* is adjacent to the right side of the first main body apparatus 2*a*. Then, if the above positional relationship is set, the positional relationships of the third main body apparatus 2*c* and the fourth main body apparatus 2*d* are not yet set, and therefore, the input object image Is displayed on the second display 12*b* is continuously displayed, thereby urging the user to perform a touch-on operation on the second touch panel 13*b*. Then, the operation for setting the positional relationships is continued.

In (d) of FIG. 15, the user performs a touch-on on the second touch panel 13*b* from a position on the input object image Is displayed on the second display 12*b* and then performs a slide operation to another one of the main body apparatuses 2 adjacent on the right to the main body apparatus 2*b* (in the example of FIG. 15, the third main body apparatus 2*c*), whereby the input object image Is makes a drag movement in accordance with the slide operation. Then, the user performs the slide operation to the periphery of the second touch panel 13*b* toward the third main body apparatus 2*c* adjacent to the main body apparatus 2*b*, then continues the slide operation to cross the gap between the second touch panel 13*b* and a third touch panel 13*c*, and performs an operation for starting a touch operation from the periphery of the third touch panel 13*c* (see an arrow shown in (d) of FIG. 15). By this slide operation, the input object image Is displayed while making a drag movement on the second display 12*b* is erased once at a peripheral portion of the second touch panel 13*b* where a touch-off is performed. Then, the input object image Is is displayed again on the third display 12*c* from a peripheral portion of the third touch panel 13*c* where a touch-on is performed. Then, the slide operation is continued from the peripheral portion on the third touch panel 13*c*, whereby the input object image Is makes a drag movement in accordance with the slide operation on the third touch panel 13*c* from the peripheral portion and is displayed on the third display 12*c*.

In (e) of FIG. 15, if the input object image Is makes a drag movement in accordance with the slide operation on the third touch panel 13*c*, and the slide operation is continued through the position of the input target image Iec displayed on the third display 12*c* without performing a touch-off, based on a touch position as a trajectory on the second touch panel 13*b* and the third touch panel 13*c* obtained by the above slide operation, a positional relationship is set such that the third main body apparatus 2*c* is adjacent to the right side of the second main body apparatus 2*b*. Then, even if the above positional relationship is set, the positional relationship of the fourth main body apparatus 2*d* is not yet set, and therefore, the input object image Is displayed on the third display 12*c* while making a drag movement is continuously displayed, and further, the slide operation for setting the positional relationships is continued.

Next, the user causes the input object image Is displayed on the third display 12*c* to make a drag movement, and performs a slide operation to another one of the main body apparatuses 2 adjacent on the right to the main body apparatus 2*c* (in the example of FIG. 15, the fourth main body apparatus 2*d*). Then, the user performs the slide operation to the periphery of the third touch panel 13*c* toward the fourth main body apparatus 2*d* adjacent to the main body apparatus 2*c*, then continues the slide operation to cross the gap between the third touch panel 13*c* and a fourth touch panel 13*d*, and performs an operation for starting a touch operation from the periphery of the fourth touch panel 13*d* (see an arrow shown in (e) of FIG. 15). By this slide operation, the input object image Is displayed while making a drag movement on the third display 12*c* is erased once at a peripheral portion of the third touch panel 13*c* where a touch-off is performed. Then, the input object image Is is displayed again on the fourth display 12*d* from a peripheral portion of the fourth touch panel 13*d* where a touch-on is performed. Then, the slide operation is continued from the peripheral portion on the fourth touch panel 13*d*, whereby the input object image Is makes a drag movement in accordance with the slide operation on the fourth touch panel 13*d* from the peripheral portion and is displayed on the fourth display 12*d*.

Then, if the slide operation on the fourth touch panel 13*d* is performed to the position where the input target image Ied is displayed on the fourth display 12*d*, and a touch-off is performed from the fourth touch panel 13*d* at a position on the input target image Ied, based on a touch position as a trajectory on the third touch panel 13*c* and the fourth touch panel 13*d* obtained by the above slide operation, a positional relationship is set such that the fourth main body apparatus 2*d* is adjacent to the right side of the third main body apparatus 2*c*. Then, if the above positional relationship is set, the positional relationships among all the main body apparatuses 2 are set, and therefore, the setting of the positional relationships among the four main body apparatuses 2 (the first main body apparatus 2a, the second main body apparatus 2b, the third main body apparatus 2c, and the fourth main body apparatus 2d) ends. Then, if the above positional relationships are set, the input object image Is and all the input target images Ie displayed on the displays 12 are erased, and a game image Ip based on the positional relationships is displayed on the first display 12a to the fourth display 12d (see (f) of FIG. 15). As an example, the game image Ip obtained by defining the coordinates on the first touch panel 13a to the fourth touch panel 13d placed horizontally in a line (the positions of pixels on the first display 12a to the fourth display 12d placed horizontally in a line), in the global coordinate space defined by the virtual game space is displayed using the first display 12a to the fourth display 12d. That is, a game image is displayed by being subjected to display control based on the positional relationships among the first display 12a to the fourth display 12d so that the display contents of the first display 12a to the fourth display 12d continue horizontally in a line.

Figure 16:
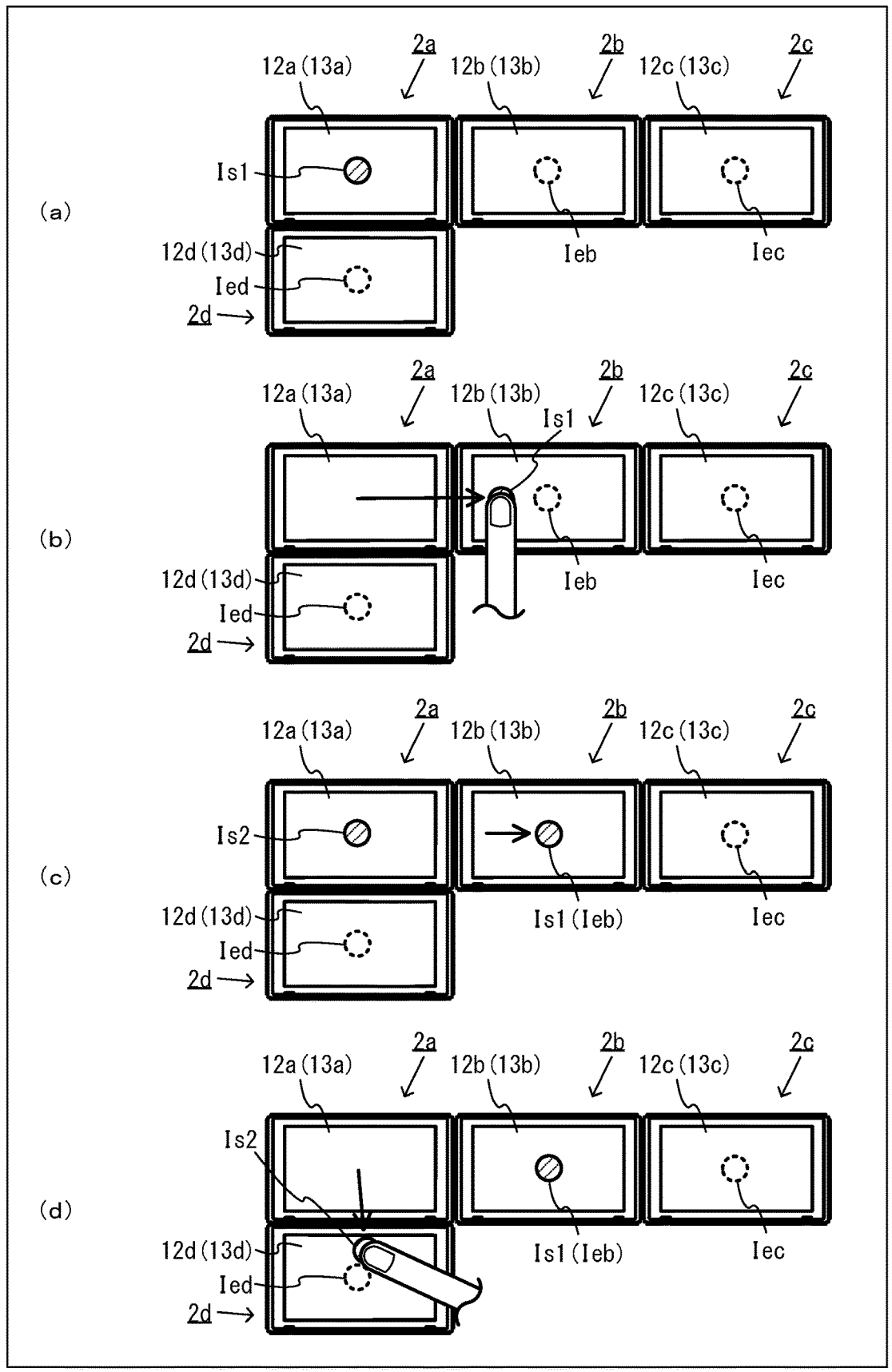
FIG. 16 is a diagram showing a non-limiting example where three or more main body apparatuses 2 are placed in any placement form, and the positional relationships among the three or more main body apparatuses 2 are set.
Figure 17:
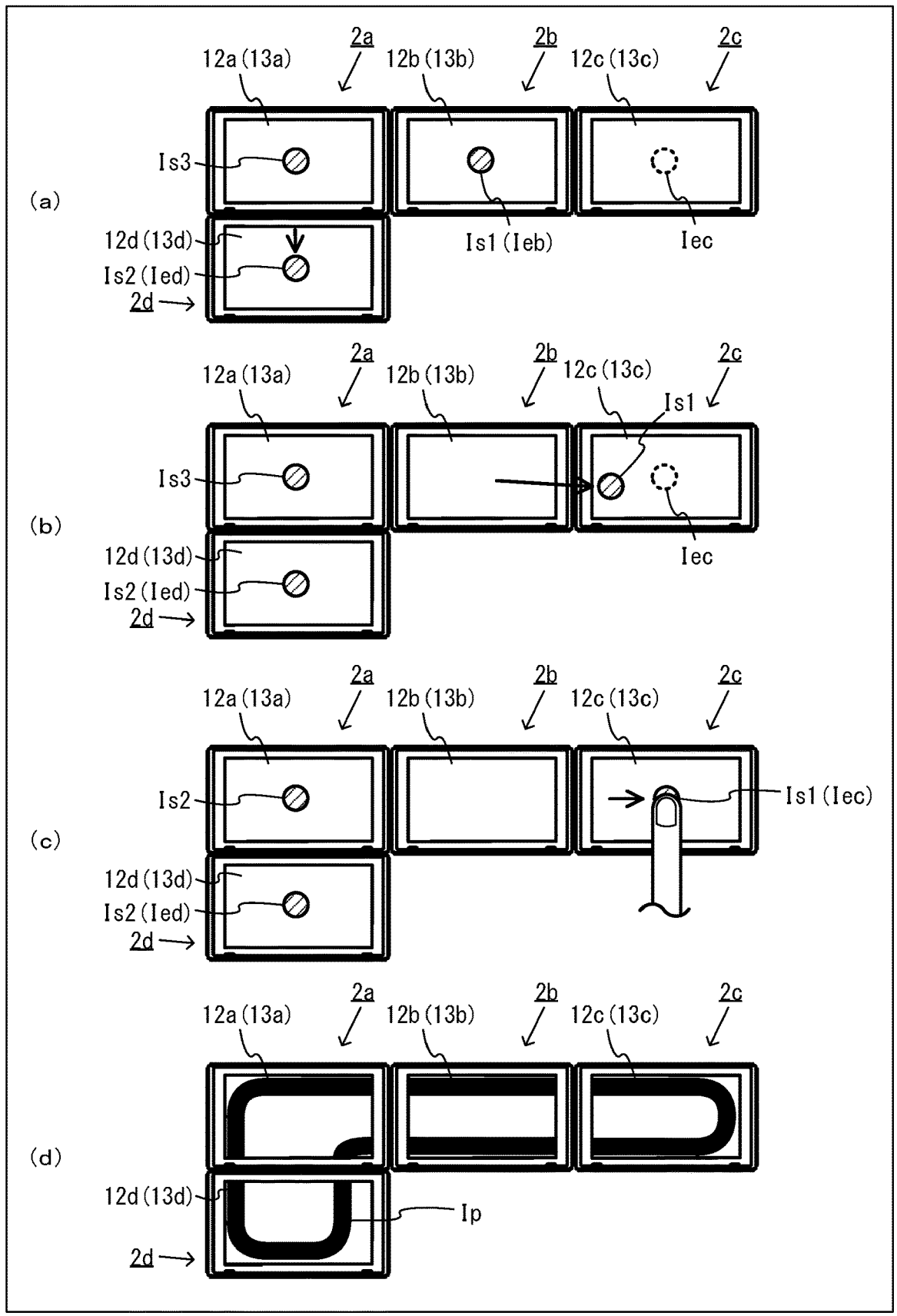
FIG. 17 is a diagram showing a non-limiting example where three or more main body apparatuses 2 are placed in any placement form, and the positional relationships among the three or more main body apparatuses 2 are set.

In an example shown in FIGS. 16 and 17, four main body apparatuses 2 (a first main body apparatus 2a, a second main body apparatus 2b, a third main body apparatus 2c, and a fourth main body apparatus 2d) are placed in any placement form, and the positional relationships among the four main body apparatuses 2 are set. For example, in the example shown in FIGS. 16 and 17, an example is used where, as any placement form, the first main body apparatus 2a, the second main body apparatus 2b, the third main body apparatus 2c, and the fourth main body apparatus 2d are placed next to each other in an L-shape, and the positional relationships among the four main body apparatuses 2 are detected and set.

In (a) of FIG. 16, the first main body apparatus 2a, the second main body apparatus 2b, the third main body apparatus 2c, and the fourth main body apparatus 2d capable of communicating with each other are mounted next to each other in an L-shape by the user. Specifically, in order from the left, the first main body apparatus 2a, the second main body apparatus 2b, and the third main body apparatus 2c are mounted next to each other horizontally in a line in the left-right direction, and the fourth main body apparatus 2d is mounted below and vertically next to the first main body apparatus 2a. Here, the first main body apparatus 2a is set as a parent apparatus in the above communication.

In the state before the process of setting the positional relationships is performed, on a first display 12a of the first main body apparatus 2a set as the parent apparatus among the plurality of main body apparatuses 2 that are mounted, an input object image Is1 is displayed at a position including the coordinates of an input start possible point on the first display 12a (e.g., a position including the center of the screen). In the state before the process of setting the positional relationships is performed, on a second display 12b, a third display 12c, and a fourth display 12d of the second main body apparatus 2b, the third main body apparatus 2c, and the fourth main body apparatus 2d set as child apparatuses, input target images Ieb, Iec, and Ied, respectively, are displayed at positions including the coordinates of input target points (e.g., positions including the centers of the screens).

In (b) of FIG. 16, the user performs a touch-on on a first touch panel 13a from a position on the input object image Is1 displayed on the first display 12a and then performs a slide operation to another one of the main body apparatuses 2 adjacent on the right to the main body apparatus 2a (in the example of FIG. 16, the second main body apparatus 2b), whereby the input object image Is1 makes a drag movement in accordance with the slide operation. Then, the user performs the slide operation to the periphery of the first touch panel 13a toward the second main body apparatus 2b adjacent on the right to the main body apparatus 2a, then continues the slide operation to cross the gap between the first touch panel 13a and a second touch panel 13b, and performs an operation for starting a touch operation from the periphery of the second touch panel 13b (see an arrow shown in (b) of FIG. 16). By this slide operation, the input object image Is1 displayed while making a drag movement on the first display 12a is erased once at a peripheral portion of the first touch panel 13a where a touch-off is performed. Then, the input object image Is1 is displayed again on the second display 12b from a peripheral portion of the second touch panel 13b where a touch-on is performed. Then, the slide operation is continued from the peripheral portion on the second touch panel 13b, whereby the input object image Is1 makes a drag movement in accordance with the slide operation on the second touch panel 13b from the peripheral portion and is displayed on the second display 12b.

If the above slide operation on the second touch panel 13b is performed to the position where the input target image Ieb is displayed on the second display 12b, and a touch-off is performed from the second touch panel 13b at a position on the input target image Ieb, based on a touch position as a trajectory on the first touch panel 13a and the second touch panel 13b obtained by the above slide operation, a positional relationship is set such that the second main body apparatus 2b is adjacent to the right side of the first main body apparatus 2a. Then, if the above positional relationship is set, the positional relationships of the third main body apparatus 2c and the fourth main body apparatus 2d are not yet set, and therefore, the input object image Is1 displayed on the second display 12b in (c) of FIG. 16 is continuously displayed at a position including the coordinates of an input start possible point on the second display 12b (e.g., a position including the center of the screen), and another input object image Is2 newly appears and is displayed at the position including the coordinates of the input start possible point on the first display 12a (e.g., the position including the center of the screen). This urges the user to perform a touch-on operation on the first touch panel 13a or the second touch panel 13b, and the operation for setting the positional relationships is continued.

In (d) of FIG. 16, after the positional relationship between the first main body apparatus 2a and the second main body apparatus 2b is set, the user performs a touch-on on the first touch panel 13a from a position on the input object image Is2 displayed on the first display 12a and then performs a slide operation to another one of the main body apparatuses 2 adjacent below to the main body apparatus 2a (in the example of FIG. 16, the fourth main body apparatus 2d), whereby the input object image Is2 makes a drag movement in accordance with the slide operation. Then, the user performs the slide operation to the periphery of the first touch panel 13a toward the fourth main body apparatus 2d adjacent below to the main body apparatus 2a, then continues the slide operation to cross the gap between the first touch panel 13a and a fourth touch panel 13d, and performs an operation for starting a touch operation from the periphery of the fourth touch panel 13d (see an arrow shown in (d) of FIG. 16). By this slide operation, the input object image Is2 displayed while making a drag movement on the first display 12a is erased once at a peripheral portion of the first touch panel 13a where a touch-off is performed. Then, the input object image Is2 is displayed again on the fourth display 12*d* from a peripheral portion of the fourth touch panel 13*d* where a touch-on is performed. Then, the slide operation is continued from the peripheral portion on the fourth touch panel 13*d*, whereby the input object image Is2 makes a drag movement in accordance with the slide operation on the fourth touch panel 13*d* from the peripheral portion and is displayed on the fourth display 12*d*.

In (a) of FIG. 17, if the above slide operation on the fourth touch panel 13*d* is performed to the position where the input target image Ied is displayed on the fourth display 12*d*, and a touch-off is performed from the fourth touch panel 13*d* at a position on the input target image Ied, based on a touch position as a trajectory on the first touch panel 13*a* and the fourth touch panel 13*d* obtained by the above slide operation, a positional relationship is set such that the fourth main body apparatus 2*d* is adjacent below to the first main body apparatus 2*a*. Then, if the above positional relationship is set, the positional relationship of the third main body apparatus 2*c* is not yet set, and therefore, the input object image Is2 displayed on the fourth display 12*d* is continuously displayed at a position including the coordinates of an input start possible point on the fourth display 12*d* (e.g., a position including the center of the screen), the input object image Is1 displayed on the second display 12*b* is also continuously displayed, and yet another input object image Is3 newly appears and is displayed at the position including the coordinates of the input start possible point on the first display 12*a* (e.g., the position including the center of the screen). This urges the user to perform a touch-on operation on the first touch panel 13*a*, the second touch panel 13*b*, or the fourth touch panel 13*d*, and the operation for setting the positional relationships is continued.

In (b) of FIG. 17, the user performs a touch-on on the second touch panel 13*b* from a position on the input object image Is1 displayed on the second display 12*b* and then performs a slide operation to another one of the main body apparatuses 2 adjacent on the right to the main body apparatus 2*b* (in the example of FIG. 17, the third main body apparatus 2*c*), whereby the input object image Is1 makes a drag movement in accordance with the slide operation. Then, the user performs the slide operation to the periphery of the second touch panel 13*b* toward the third main body apparatus 2*c* adjacent to the main body apparatus 2*b*, then continues the slide operation to cross the gap between the second touch panel 13*b* and a third touch panel 13*c*, and performs an operation for starting a touch operation from the periphery of the third touch panel 13*c* (see an arrow shown in (b) of FIG. 17). By this slide operation, the input object image Is1 displayed while making a drag movement on the second display 12*b* is erased once at a peripheral portion of the second touch panel 13*b* where a touch-off is performed. Then, the input object image Is1 is displayed again on the third display 12*c* from a peripheral portion of the third touch panel 13*c* where a touch-on is performed. Then, the slide operation is continued from the peripheral portion on the third touch panel 13*c*, whereby the input object image Is1 makes a drag movement in accordance with the slide operation on the third touch panel 13*c* from the peripheral portion and is displayed on the third display 12*c*.

In (c) of FIG. 17, if the above slide operation on the third touch panel 13*c* is performed to the position where the input target image Iec is displayed on the third display 12*c*, and a touch-off is performed from the third touch panel 13*c* at a position on the input target image Iec, based on a touch position as a trajectory on the second touch panel 13*b* and the third touch panel 13*c* obtained by the above slide operation, a positional relationship is set such that the third main body apparatus 2*c* is adjacent to the right side of the second main body apparatus 2*b*. Then, if the above positional relationship is set, the positional relationships among all the main body apparatuses 2 are set, and therefore, the setting of the positional relationships among the four main body apparatuses 2 (the first main body apparatus 2*a*, the second main body apparatus 2*b*, the third main body apparatus 2*c*, and the fourth main body apparatus 2*d*) ends. Then, if the above positional relationships are set, the input object images Is1, Is2, and Is3 and all the input target images Ie displayed on the displays 12 are erased, and a game image Ip based on the positional relationships is displayed on the first display 12*a* to the fourth display 12*d* (see (d) of FIG. 17). As an example, the game image Ip obtained by defining the coordinates on the first touch panel 13*a* to the fourth touch panel 13*d* placed in an L-shape (the positions of pixels on the first display 12*a* to the fourth display 12*d* placed in an L-shape), in the global coordinate space defined by the virtual game space is displayed using the first display 12*a* to the fourth display 12*d*. That is, a game image is displayed by being subjected to display control based on the positional relationships among the first display 12*a* to the fourth display 12*d* so that the display contents of the first display 12*a* to the fourth display 12*d* continue in an L-shape.

In the descriptions with reference to FIGS. 15 to 17, examples are used where both a position including the coordinates of an input start possible point and a position including the coordinates of an input target point are set at positions including the centers of the screens. These positions, however, may not be at exactly the same coordinates between the apparatuses. For example, depending on the displays or the touch panels for use, the resolutions may differ between the apparatuses. In this case, the coordinates of an input start possible point and the coordinates of an input target point differ. Thus, even if an input start possible point and an input target point are set at positions including the centers of the screens as described above, the input start possible points and the input target points can be set at different coordinates between the apparatuses.

Figure 18:
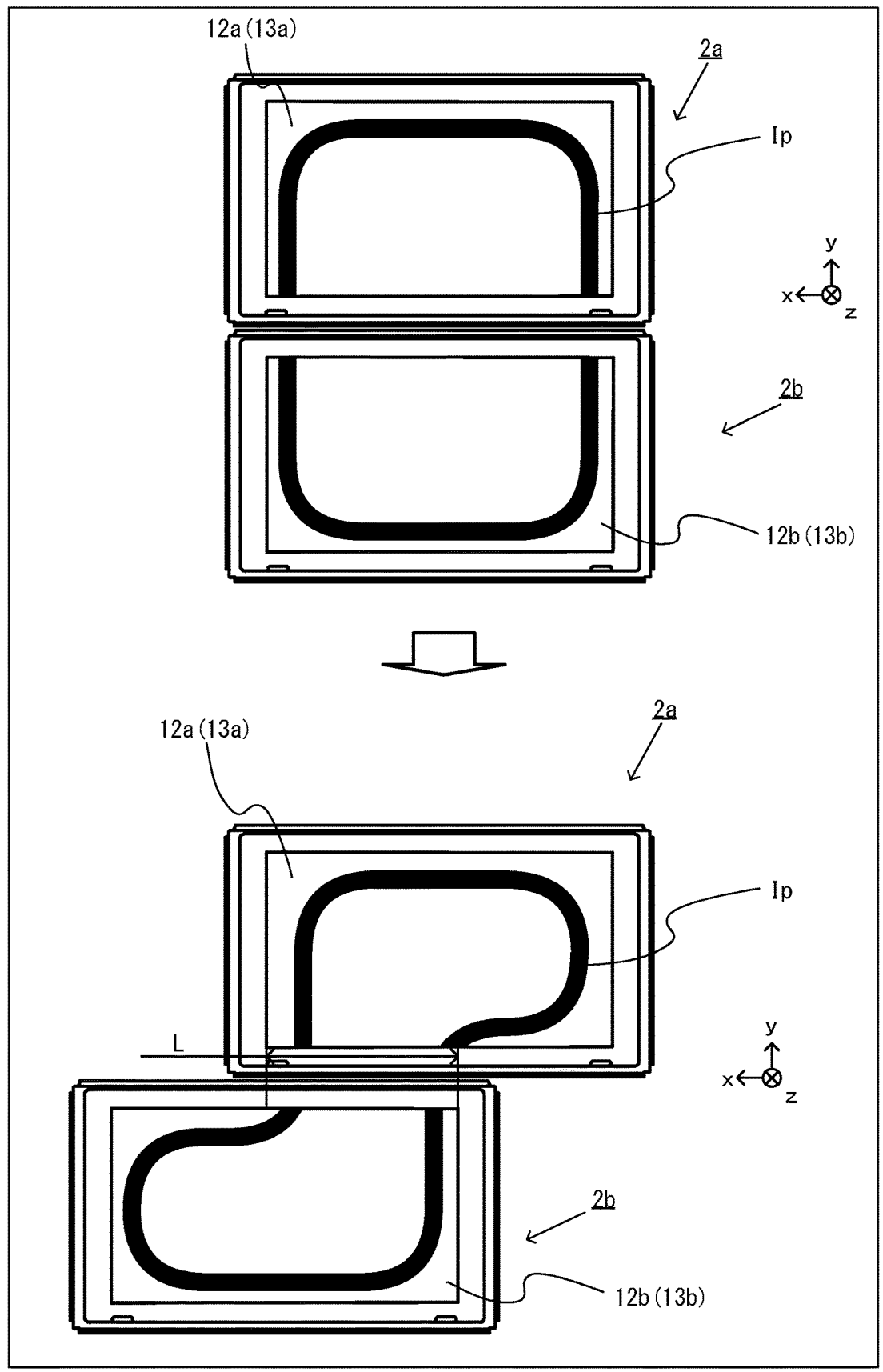
FIG. 18 is a diagram showing a non-limiting example where a game image is displayed by also defining a positional shift between main body apparatuses 2 placed adjacent to each other in a global coordinate space defined by a virtual game space.
Figure 19:
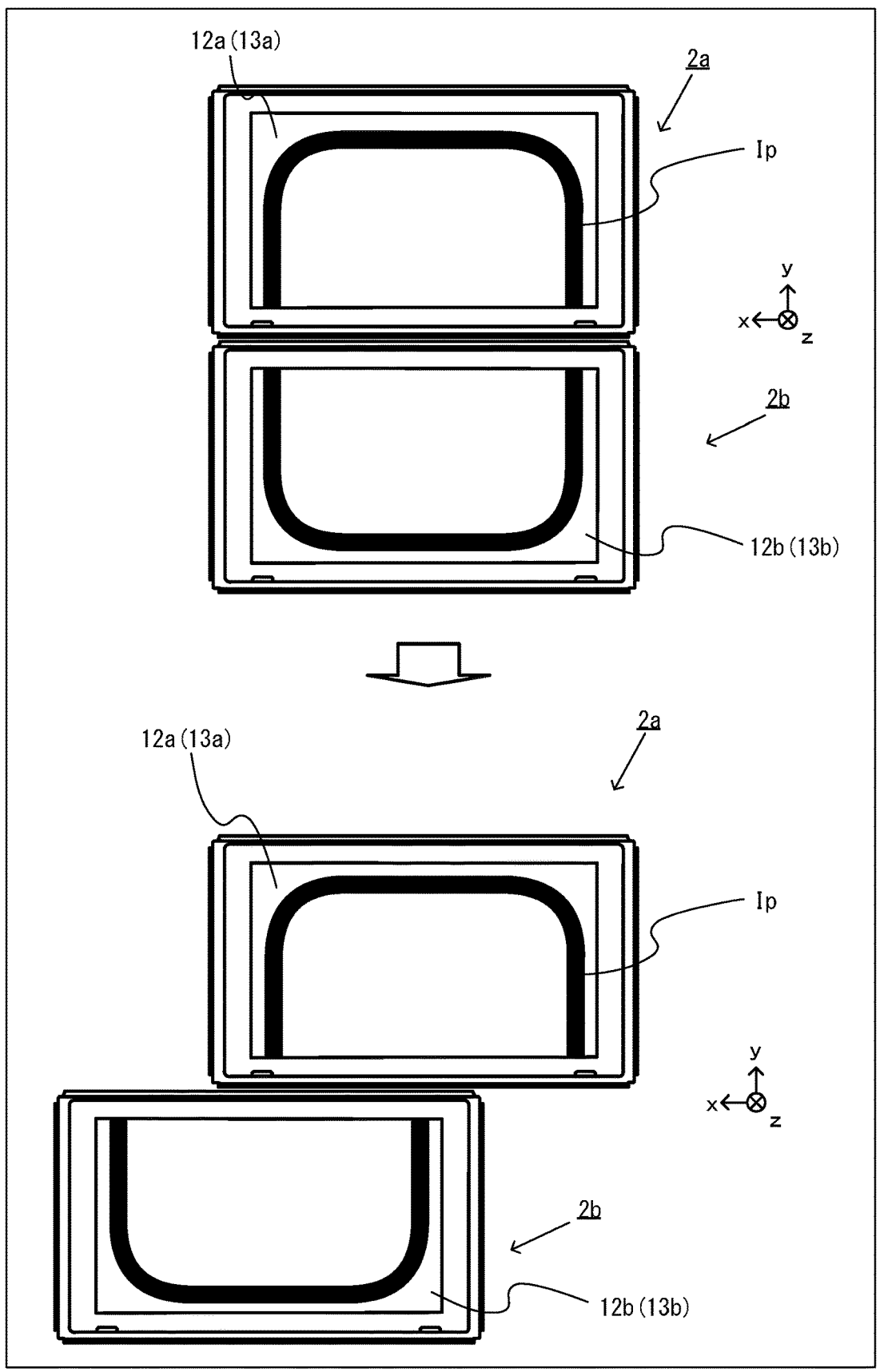
FIG. 19 is a diagram showing a non-limiting example where a game image is displayed without defining a positional shift between main body apparatuses 2 placed adjacent to each other in the global coordinate space defined by the virtual game space.

Next, with reference to FIGS. 18 and 19, a description is given of the relationship between a positional shift between main body apparatuses 2 placed adjacent to each other and a display image. As an example, with reference to FIG. 18, an example is described where a game image is displayed by also defining a positional shift between main body apparatuses 2 placed adjacent to each other in the global coordinate space defined by the virtual game space. As another example, with reference to FIG. 19, an example is described where a game image is displayed without defining a positional shift between main body apparatuses 2 placed adjacent to each other in the global coordinate space defined by the virtual game space.

In FIG. 18, an example is used where a single game image Ip is displayed using two main body apparatuses 2 (a first main body apparatus 2*a* and a second main body apparatus 2*b*). For example, as shown in the upper diagram of FIG. 18, the first main body apparatus 2*a* and the second main body apparatus 2*b* are mounted so that in the state where the left-right directions of both the first main body apparatus 2*a* and the second main body apparatus 2*b* are their long axis directions, the first main body apparatus 2*a* and the second main body apparatus 2*b* are vertically adjacent to each other with the first main body apparatus 2*a* on the upper side and the second main body apparatus 2*b* on the lower side. Then, the first main body apparatus 2*a* and the second main body apparatus 2*b* are placed adjacent to each other such that in the state where a lower side surface of the first main body apparatus 2a and an upper side surface of the second main body apparatus 2b are in surface contact with each other, the center line directions in the up-down direction (a y-axis direction shown in FIG. 18) of the first main body apparatus 2a and the second main body apparatus 2b coincide with each other. If the first main body apparatus 2a and the second main body apparatus 2b are placed adjacent to each other in the state where there is not a positional shift in the left-right direction between the first main body apparatus 2a and the second main body apparatus 2b as described above, the positions of pixels on a first display 12a and a second display 12b adjacent to each other without a positional shift are defined in the global coordinate space defined by the virtual game space. Thus, on the first display 12a and the second display 12b adjacent to each other without a positional shift, the single game image Ip is displayed such that the display content of the first display 12a and the display content of the second display 12b are continuous without a positional shift. As an example, in the example of the upper diagram of FIG. 18, the game image Ip representing a game course that makes a round of a rounded-corner rectangular shape is displayed on the first display 12a and the second display 12b.

A case is considered where, for example, as shown in the lower diagram of FIG. 18, the first main body apparatus 2a and the second main body apparatus 2b are placed adjacent to each other in the state where the lower side surface of the first main body apparatus 2a and the upper side surface of the second main body apparatus 2b are in surface contact with each other, and the center line directions in the up-down direction (the y-axis direction shown in FIG. 18) of the first main body apparatus 2a and the second main body apparatus 2b are shifted from each other. If the first main body apparatus 2a and the second main body apparatus 2b are placed adjacent to each other in the state where there is a positional shift in the left-right direction between the first main body apparatus 2a and the second main body apparatus 2b as described above, the positions of pixels on the first display 12a and the second display 12b adjacent to each other are defined in the global coordinate space defined by the virtual game space, by including the positional shift in the left-right direction. Thus, even if the first display 12a and the second display 12b are adjacent to each other in the state where there is a positional shift between the first display 12a and the second display 12b, the single game image Ip is displayed such that the display content of the first display 12a and the display content of the second display 12b are continuous without a positional shift.

For example, as described with reference to FIGS. 9 and 10, regarding the setting of the positions of the first display 12a and the second display 12b in the global coordinate space, since the sizes of and the coordinates on the first touch panel 13a and the second touch panel 13b and the first display 12a and the second display 12b are known, if the first vector V1 and the second vector V2 are calculated, the positional relationship and the angle between the first touch panel 13a and the second touch panel 13b can be calculated. As a result, on the first display 12a and the second display 12b, the game image Ip corresponding to the placement positions of the first main body apparatus 2a and the second main body apparatus 2b including a positional shift in the left-right direction can be displayed.

As an example, in a case where a game image is displayed on the first display 12a and the second display 12b adjacent to each other in the state where there is a positional shift between the first display 12a and the second display 12b as described above, the virtual game space may be distorted in accordance with the screen shapes resulting from the positional shift, and a game image representing the virtual game space may be displayed on the first display 12a and the second display 12b. If the first main body apparatus 2a and the second main body apparatus 2b are placed adjacent to each other in the state where, for example, as shown in the lower diagram of FIG. 18, the lower side surface of the first main body apparatus 2a and the upper side surface of the second main body apparatus 2b are in surface contact with each other, and the center line directions in the up-down direction (the y-axis direction shown in FIG. 18) of the first main body apparatus 2a and the second main body apparatus 2b are shifted from each other in the left-right direction, this results in the state where the first display 12a and the second display 12b are adjacent to each other in an approximate S-shape. Thus, the length at which the first main body apparatus 2a and the second main body apparatus 2b are in contact with each other is shorter than the length of each of the above side surfaces, and the length at which the first display 12a and the second display 12b overlap each other in the left-right direction (a length L shown in FIG. 18) is shorter than the length in the left-right direction of each of the first display 12a and the second display 12b. Thus, the length at which the virtual game world displayed on the first display 12a and the virtual game world displayed on the second display 12b seem to be connected together (the length L shown in FIG. 18) is shorter than the length in the left-right direction of another portion. That is, an image of the virtual game space displayed on the first display 12a and the second display 12b has a shape narrowed from the left and right in a connection portion of the first display 12a and the second display 12b. As described above, in a case where the virtual game space having a shape narrowed from the left and right in the connection portion is displayed, a game image displayed on the first display 12a and the second display 12b may also be deformed into a shape narrowed in the connection portion. For example, as shown in the lower diagram of FIG. 18, the game course that makes a round of a rounded-corner rectangular shape may be displayed as the single game image Ip so that in the state where the game course is deformed into a shape narrowed from the left and right in the connection portion, the display content of the first display 12a and the display content of the second display 12b are continuous without a positional shift. As described above, a virtual game space is distorted, whereby it is possible to form a virtual game space corresponding to the positional relationship between a plurality of main body apparatuses 2 and enable a new strategy for a game using the virtual game space.

Next, with reference to FIG. 19, an example is described where a game image is displayed on the premise that a positional shift between main body apparatuses 2 adjacent to each other in the global coordinate space defined by the virtual game space is not defined, i.e., the main body apparatuses 2 are placed adjacent to each other in the state where there is not a positional shift between the main body apparatuses 2. A case is considered where, for example, as shown in the lower diagram of FIG. 19, the first main body apparatus 2a and the second main body apparatus 2b are placed adjacent to each other in the state where the lower side surface of the first main body apparatus 2a and the upper side surface of the second main body apparatus 2b are in surface contact with each other, and the center line directions in the up-down direction (a y-axis direction shown in FIG. 19) of the first main body apparatus 2a and the second main body apparatus 2b are shifted from each other. Even if the first main body apparatus 2a and the second main body apparatus 2b are placed adjacent to each other in the state where there is a positional shift in the left-right direction between the first main body apparatus 2a and the second main body apparatus 2b as described above, the positions of pixels on the first display 12a and the second display 12b adjacent to each other are defined in the global coordinate space defined by the virtual game space without taking into account a positional shift in the left-right direction so that the display content of the first display 12a and the display content of the second display 12b are continuous without a positional shift. Thus, if the first display 12a and the second display 12b are adjacent to each other in the state where there is a positional shift between the first display 12a and the second display 12b, the single game image Ip may be displayed in a discontinuous state where the display content of the first display 12a and the display content of the second display 12b are shifted by an amount of shift corresponding to the positional shift. In a case where such a game image is displayed, the user moves the placement of at least one of the main body apparatuses 2 to solve the positional shift in the displayed game image, and thereby can correct the game image to a display state as shown in the upper diagram of FIG. 19. In a case where such a game image is displayed, it is not necessary to calculate the exact positional relationship between the first display 12a and the second display 12b. Thus, it is possible to simplify the process of calculating the positional relationship between the first main body apparatus 2a and the second main body apparatus 2b. Thus, it is possible to reduce processing load.

Each of the above plurality of examples of the relationship between a positional shift between main body apparatuses 2 placed adjacent to each other and a display image can be applied to any of the examples of placements based on the positional relationship set between a plurality of main body apparatuses 2. For example, with reference to FIGS. 15 to 17, an example is described where the positional relationships among three or more main body apparatuses 2 are set. The plurality of examples of the relationship between a positional shift between main body apparatuses 2 and a display image can be applied to any of the examples.

Figure 20:
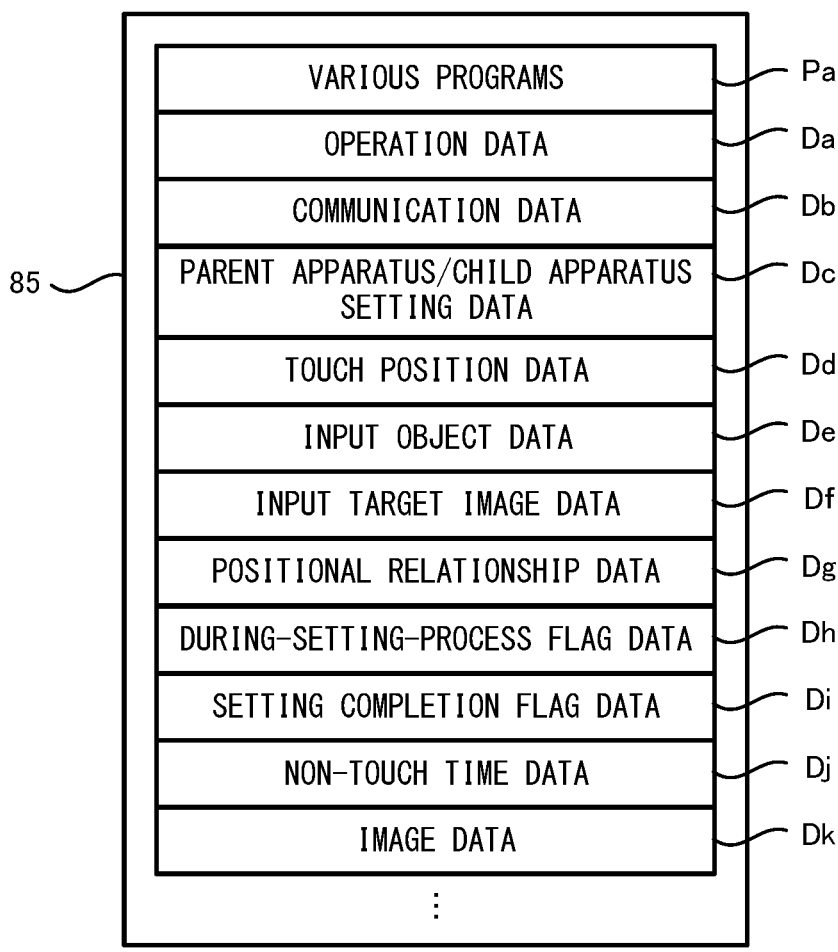
FIG. 20 is a diagram showing a non-limiting example of a data area set in a DRAM 85 of each of a plurality of main body apparatuses 2.

Next, with reference to FIGS. 20 to 24, a description is given of an example of a specific process executed between two main body apparatuses 2 in the exemplary embodiment. FIG. 20 is a diagram showing an example of a data area set in the DRAM 85 of each of the plurality of main body apparatuses 2 in the exemplary embodiment. It should be noted that in the DRAM 85, in addition to the data shown in FIG. 20, data used in another process is also stored, but is not described in detail here.

In a program storage area of the DRAM 85, various programs Pa, which are executed by the game system 1, are stored. In the exemplary embodiment, as the various programs Pa, a communication program for wirelessly communicating with the left controller 3 and the right controller 4 and wirelessly communicating with another game system 1 (another main body apparatus 2), an application program for performing information processing for setting the positional relationship between the plurality of main body apparatuses 2 and information processing (e.g., game processing) based on data acquired from the touch panel 13, the left controller 3, and/or the right controller 4, and the like are stored. It should be noted that the various programs Pa may be stored in advance in the flash memory 84, or may be acquired from a storage medium attachable to and detachable from the game system 1 (e.g., a predetermined type of a storage medium attached to the slot 23) and stored in the DRAM 85, or may be acquired from another apparatus via a network such as the Internet and stored in the DRAM 85. The processor 81 executes the various programs Pa stored in the DRAM 85.

Further, in a data storage area of the DRAM 85, various data used for processes such as a communication process and information processing executed by the game system 1 is stored. In the exemplary embodiment, in the DRAM 85, operation data Da, communication data Db, parent apparatus/child apparatus setting data Dc, touch position data Dd, input object data De, input target image data Df, positional relationship data Dg, during-setting-process flag data Dh, setting completion flag data Di, non-touch time data Dj, image data Dk, and the like are stored.

The operation data Da is operation data appropriately acquired from each of the touch panel 13, the left controller 3, and/or the right controller 4. As described above, operation data transmitted from each of the left controller 3 and/or the right controller 4 includes information regarding an input (specifically, information regarding an operation or the detection result of each sensor) from each of the input sections (specifically, each button, each analog stick, and each sensor). In the exemplary embodiment, operation data is transmitted in a predetermined cycle from each of the left controller 3 and/or the right controller 4 through wireless communication, and the operation data Da is appropriately updated using the received operation data. In the exemplary embodiment, data indicating a touch position (touch coordinates) on the touch panel 13 is acquired from the touch panel 13 of the main body apparatus 2 in a predetermined cycle. The operation data Da is appropriately updated using the acquired touch position data. It should be noted that the update cycle of the operation data Da may be such that the operation data Da is updated every frame, which is the cycle of the processing described later executed by the main body apparatus 2, or is updated every cycle in which the above operation data is transmitted through the wireless communication or every cycle in which touch position data is acquired.

The communication data Db is data to be wirelessly transmitted to another game system 1 (another main body apparatus 2) or data received from another game system 1 (another main body apparatus 2). The parent apparatus/child apparatus setting data Dc is data indicating whether or not the main body apparatus 2 is set as a parent apparatus or a child apparatus in a communication process with another game system 1 (another main body apparatus 2).

The touch position data Dd includes history data of a touch position (touch coordinates) on the touch panel 13 of the main body apparatus 2, and history data of a touch position (touch coordinates) on the touch panel 13 of another game system 1 (another main body apparatus 2) capable of performing wireless communication.

The input object data De is data indicating the position of an input object displayed on at least one of the displays 12 of a plurality of main body apparatuses 2 capable of performing wireless communication. The input target image data Df is data indicating the position of an input target image displayed on at least one of the displays 12 of a plurality of main body apparatuses 2 capable of performing wireless communication.

The positional relationship data Dg is data indicating the positional relationship between a plurality of main body apparatuses 2 capable of performing wireless communication.

The during-setting-process flag data Dh is data indicating a during-setting-process flag that is set to on in a case where the process for setting the positional relationship between a plurality of main body apparatuses 2 is performed. The setting completion flag data Di is data indicating a setting completion flag that is set to on in a case where the process for setting the positional relationship between a plurality of main body apparatuses 2 ends.

The non-touch time data Dj is data indicating the time required for a slide operation to cross the gap between a plurality of touch panels 13.

The image data Dk is data for displaying images (e.g., an image of a player character, an image of a virtual object, an information image, a field image, a background image, and the like) on display screens when a setting process and a game are performed.

Figure 22:
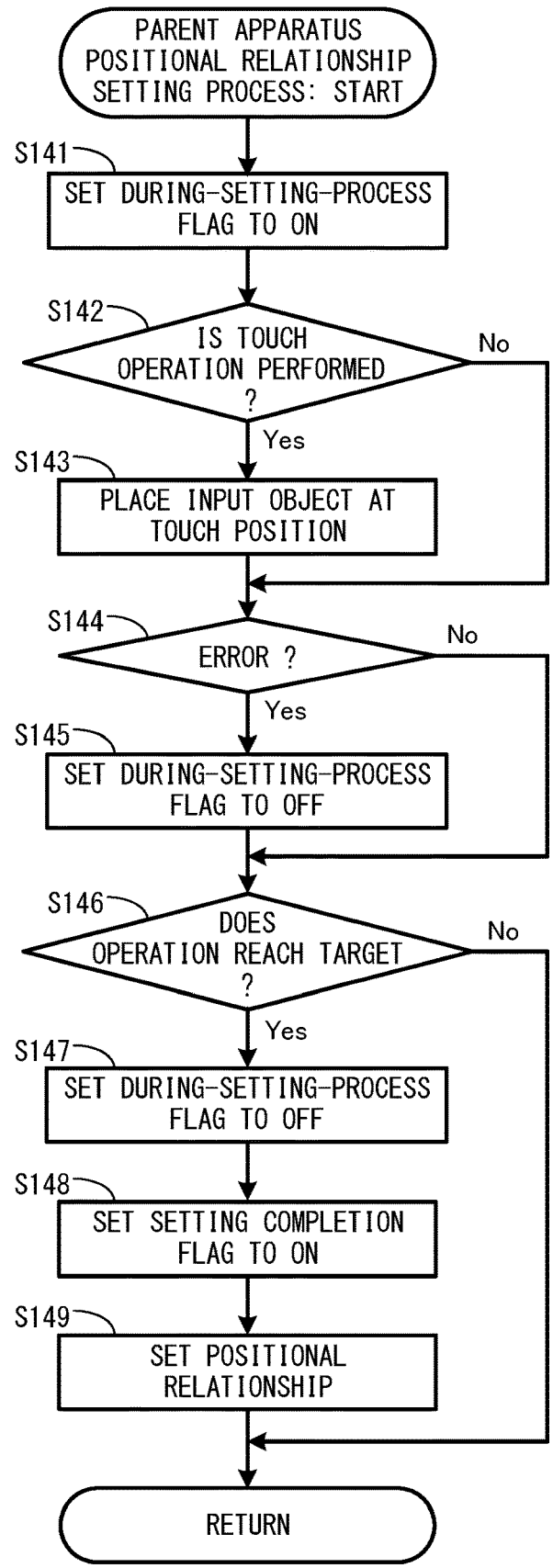
FIG. 22 is a non-limiting detailed example of a subroutine showing a parent apparatus positional relationship setting process performed in step S129 in FIG. 21.
Figure 23:
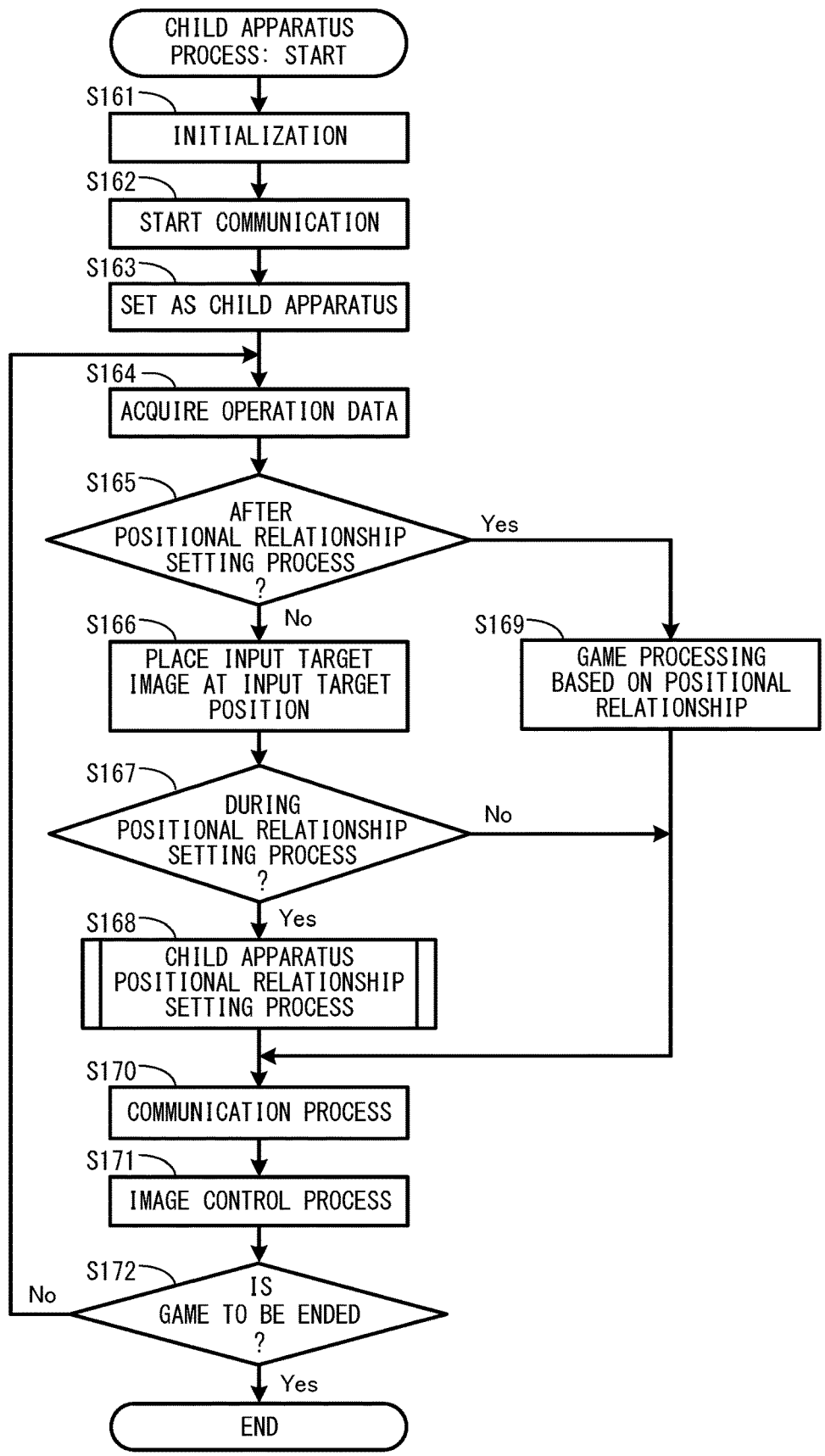
FIG. 23 is a non-limiting example of a flow chart showing information processing executed by a game system 1 set as a child apparatus.
Figure 24:
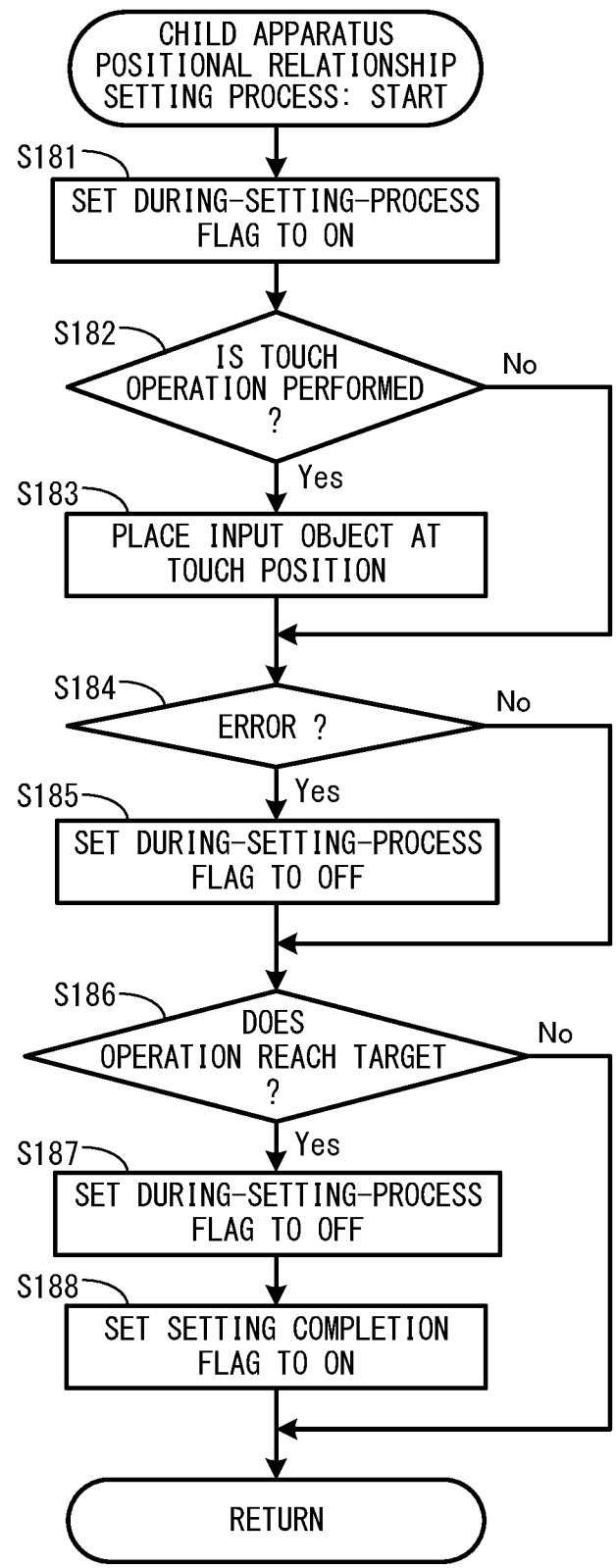
FIG. 24 is a non-limiting detailed example of a subroutine showing a child apparatus positional relationship setting process performed in step S168 in FIG. 23.

Next, with reference to FIGS. 21 to 24, a detailed example of information processing (positional relationship setting processes and game processing) according to the exemplary embodiment is described. FIG. 21 is a flow chart showing an example of information processing executed by a game system 1 set as a parent apparatus. FIG. 22 is a subroutine showing a detailed example of a parent apparatus positional relationship setting process performed in step S129 in FIG. 21. FIG. 23 is a flow chart showing an example of information processing executed by a game system 1 set as a child apparatus. FIG. 24 is a subroutine showing a detailed example of a child apparatus positional relationship setting process performed in step S168 in FIG. 23. In the exemplary embodiment, a series of processes shown in FIGS. 21 to 24 is performed by the processor 81 executing a communication program or a predetermined application program (a game program) included in the various programs Pa. Further, the game processing shown in FIGS. 21 to 24 is started at any timing.

It should be noted that the processes of all of the steps in the flow charts shown in FIGS. 21 to 24 are merely illustrative. Thus, the processing order of the steps may be changed, or another process may be performed in addition to (or instead of) the processes of all of the steps, so long as similar results are obtained. Further, in the exemplary embodiment, descriptions are given on the assumption that the processor 81 performs the processes of all of the steps in the flow charts. Alternatively, a processor or a dedicated circuit other than the processor 81 may perform the processes of some of the steps in the flow charts. Yet alternatively, part of the processing performed by the main body apparatus 2 may be executed by another information processing apparatus capable of communicating with the main body apparatus 2 (e.g., a server capable of communicating with the main body apparatus 2 via a network). That is, all the processes shown in FIGS. 21 to 24 may be executed by the cooperation of a plurality of information processing apparatuses including the main body apparatus 2.

First, with reference to FIGS. 21 and 22, a description is given of the processing of a main body apparatus 2 to be set as a parent apparatus. In FIG. 21, the processor 81 performs initialization in game processing (step S121), and the processing proceeds to the next step. For example, in the initialization, the processor 81 initializes parameters for performing the processing described below.

Next, the processor 81 starts wirelessly communicating with another main body apparatus 2 (step S122), and the processing proceeds to the next step. For example, the processor 81 serves as a parent apparatus in the wireless communication to be started, and starts communicating with another main body apparatus 2. If a connection (pairing) with the other main body apparatus 2 is established, the main body apparatuses 2 enter the state where the main body apparatuses 2 can communicate with each other. Then, the identification number of the other main body apparatus 2 as the communication partner is stored. As an example, the processor 81 broadcasts parent apparatus information for communicating with the other main body apparatus 2, thereby waiting for a response from the other main body apparatus 2. Then, the processor 81 receives child apparatus information as a communication participation request from the other main body apparatus 2, thereby establishing a connection (pairing) with the other main body apparatus 2.

Next, the processor 81 sets the main body apparatus 2 including the processor 81 as a parent apparatus in the wireless communication and stores, in the parent apparatus/child apparatus setting data Dc, apparatus information (the identification number) regarding the child apparatus with which the connection is established (step S123), and the processing proceeds to the next step.

Next, the processor 81 acquires operation data from the touch panel 13 of the main body apparatus 2 including the processor 81, the left controller 3, and/or the right controller 4 and updates the operation data Da (step S124), and the processing proceeds to the next step. Then, the processor 81 adds, to the touch position data Dd, operation data indicating a touch position obtained from the touch panel 13 of the main body apparatus 2 including the processor 81, as the history of new touch position data.

Next, the processor 81 determines whether or not it is before a positional relationship setting process (step S125). For example, if the during-setting-process flag indicated by the during-setting-process flag data Dh is off, and the setting completion flag indicated by the setting completion flag data Di is off, the determination of the processor 81 is affirmative in the above step S125. Then, if it is before the positional relationship setting process, the processing proceeds to step S126. If, on the other hand, it is during the positional relationship setting process or after the positional relationship setting process, the processing proceeds to step S128.

In step S126, the processor 81 places an input object at a position including an input start possible position on the touch panel 13 (the display 12) of the main body apparatus 2 including the processor 81, and the processing proceeds to the next step. For example, with the center of the screen of the touch panel 13 (the display 12) of the main body apparatus 2 including the processor 81 as an input start possible position, the processor 81 sets the position of the input object so that the center of the input object image Is is placed at the input start possible position, thereby updating the input object data De.

Next, the processor 81 determines whether or not the process of setting the positional relationship is to be started (step S127). For example, if the latest touch position acquired in the above step S124 overlaps the input object image Is displayed at the input start possible position on the display 12 of the main body apparatus 2 including the processor 81, the determination of the processor 81 is affirmative in the above step S127. Then, if the process of setting the positional relationship is to be started, the processing proceeds to step S129. On the other hand, if the process of setting the positional relationship is not to be started, the processing proceeds to step S131.

If, on the other hand, it is determined in the above step S125 that it is not before the positional relationship setting process, the processor 81 determines whether or not it is during the positional relationship setting process (step S128). For example, if the during-setting-process flag indicated by the during-setting-process flag data Dh is on, the determination of the processor 81 is affirmative in the above step S128. Then, if it is during the positional relationship setting process, the processing proceeds to step S129. If, on the other hand, it is after the positional relationship setting process, the processing proceeds to step S130.

In step S129, the processor 81 performs the positional relationship setting process in the parent apparatus, and the processing proceeds to step S131. With reference to FIG. 22, a description is given of the positional relationship setting process in the parent apparatus performed in the above step S129.

In FIG. 22, the processor 81 sets the during-setting-process flag to on (step S141), and the processing proceeds to the next step. For example, the processor 81 sets the during-setting-process flag indicated by the during-setting-process flag data Dh to on, thereby updating the during-setting-process flag data Dh.

Next, the processor 81 determines whether or not a touch operation on the touch panel 13 of the main body apparatus 2 including the processor 81 is performed (step S142). For example, if the latest touch position acquired in the above step S124 indicates that a touch operation is performed on the touch panel 13 of the main body apparatus 2 including the processor 81, the determination of the processor 81 is affirmative in the above step S142. Then, if the touch operation is performed, the processing proceeds to step S143. If, on the other hand, the touch operation is not performed, the processing proceeds to step S144. If the latest touch position acquired in the previous processing indicates an edge portion of the touch panel 13 (the display 12) of the main body apparatus 2 including the processor 81, and it is detected that the touch operation on the touch panel 13 of the main body apparatus 2 including the processor 81 is not performed in the current processing, the processor 81 initializes the non-touch time data Dj and starts measuring a non-touch time. Then, every time the determination is negative in the above step S142 in the following processing, the processor 81 adds a predetermined number to a non-touch time count indicated by the non-touch time data Dj. If acquiring, from the other main body apparatus 2, data indicating that a touch operation is performed, the processor 81 stops adding the predetermined number to the non-touch time count indicated by the non-touch time data Dj and initializes the non-touch time data Dj. If it is detected that the touch operation on the touch panel 13 of the main body apparatus 2 including the processor 81 is not performed, the processor 81 sets the position of the input object to NULL once and brings the input object image Is into a non-display state while the non-touch time is counted.

In step S143, the processor 81 places the input object at a position including a position overlapping the latest touch position on the touch panel 13 of the main body apparatus 2 including the processor 81, and the processing proceeds to step S144. For example, the processor 81 sets the position of the input object so that the center of the input object image Is is placed at the latest touch position on the main body apparatus 2 including the processor 81 indicated by the touch position data Dd, thereby updating the input object data De.

In step S144, the processor 81 determines whether or not an error occurs in the positional relationship setting process. For example, in a case where an inappropriate touch operation is detected as the operation for setting the positional relationship, such as a case where a touch-off is performed at a position other than an edge portion of the touch panel 13 (the display 12) of the main body apparatus 2 including the processor 81, a case where the non-touch time indicated by the non-touch time data Dj reaches a predetermined time, a case where the moving velocity of a touch position of a slide operation performed on the touch panel 13 of the main body apparatus 2 including the processor 81 exceeds a predetermined velocity, or a case where information indicating that an error occurs is acquired from the other main body apparatus 2, the determination of the processor 81 is affirmative in the above step S144. Then, if an error occurs in the positional relationship setting process, the processing proceeds to step S145. If, on the other hand, an error does not occur in the positional relationship setting process, the processing proceeds to step S146.

In step S145, the processor 81 sets the during-setting-process flag to off, and the processing proceeds to step S146. For example, the processor 81 sets the during-setting-process flag indicated by the during-setting-process flag data Dh to off, thereby updating the during-setting-process flag data Dh.

In step S146, the processor 81 determines whether or not a slide operation for setting the positional relationship reaches an input target position on the other main body apparatus 2. For example, if the processor 81 acquires, from the other main body apparatus 2, information indicating that a slide operation for setting the positional relationship reaches an input target position on the other main body apparatus 2, the determination of the processor 81 is affirmative in the above step S146. Then, if the above slide operation reaches the input target position, the processing proceeds to step S147. If, on the other hand, the slide operation does not reach the input target position, the processing of this subroutine ends.

In step S147, the processor 81 sets the during-setting-process flag to off, and the processing proceeds to the next step. For example, the processor 81 sets the during-setting-process flag indicated by the during-setting-process flag data Dh to off, thereby updating the during-setting-process flag data Dh.

Next, the processor 81 sets the setting completion flag to on (step S148), and the processing proceeds to the next step. For example, the processor 81 sets the setting completion flag indicated by the setting completion flag data Di to on, thereby updating the setting completion flag data Di.

Next, the processor 81 sets the positional relationship with the other main body apparatus 2 (step S149), and the processing of this subroutine ends. For example, the processor 81 references the touch position data Dd, acquires the history of a touch position on the main body apparatus 2 including the processor 81 and the history of a touch position on the child apparatus as the communication partner, calculates the first vector V1 on the parent apparatus (the main body apparatus 2 including the processor 81) and the second vector V2 on the child apparatus, and updates the positional relationship data Dg using the positional relationship set using the first vector V1 and the second vector V2. Then, the processor 81 erases both the input object image Is and the input target image Ie. The method for calculating the first vector V1 and the second vector V2 and the method for calculating the positional relationship between the main body apparatuses 2 from the first vector V1 and the second vector V2 have been described with reference to FIGS. 8 to 10, and therefore are not described in detail here.

Referring back to FIG. 21, if it is determined in the above step S128 that it is not during the positional relationship setting process, the processor 81 performs game processing based on the positional relationship with the other main body apparatus 2 (step S130), and the processing proceeds to step S131. The process of displaying a game image on a plurality of displays 12 using the positional relationship between the displays 12 has been described above, and therefore is not described in detail here.

In step S131, the processor 81 performs a communication process with the other main body apparatus 2, and the processing proceeds to the next step. In this communication process, a touch position of a touch operation performed on the touch panel 13 of each apparatus and various data calculated based on each touch position are transmitted and received between the apparatuses every time frame processing is performed. Thus, processing performed by one of the main body apparatuses 2 is transmitted to the other main body apparatus 2, and each main body apparatus 2 can reference data of the other.

For example, the processor 81 updates reception data in the communication data Db using communication data received from the other main body apparatus 2. Then, the processor 81 performs processing based on the content of the reception data. As an example, if the processor 81 acquires, from the other main body apparatus 2, touch position data detected by the other main body apparatus 2, the processor 81 adds the touch position data as the history of new touch position data of the other apparatus to the touch position data Dd. As another example, if the processor 81 acquires, from the other main body apparatus 2, information indicating that an error occurs in the positional relationship setting process, the processor 81 performs the process of the above step S144 based on the information.

The processor 81 generates data to be transmitted to the other main body apparatus 2, appropriately stores the data in transmission data in the communication data Db, and transmits the transmission data to the other main body apparatus 2 in the above step S131. As an example, the processor 81 stores various data calculated and set in the above processing in transmission data in the communication data Db and transmits the transmission data to the other main body apparatus 2.

Next, the processor 81 performs a display control process for generating a display image and displaying the display image on the display 12 (step S132), and the processing proceeds to the next step. For example, based on the input object data De, the processor 81 displays the input object image Is on the display 12. If the positional relationship with the other main body apparatus 2 is already set, the processor 81 displays a game image corresponding to the game processing in the above step S130 on the display 12, using a global coordinate space in a virtual game space based on the positional relationship.

Next, the processor 81 determines whether or not the game is to be ended (step S133). Examples of a condition for ending the game in the above step S133 include the fact that the result of the game is finalized, the fact that the user performs the operation for ending the game, and the like. If the game is not to be ended, the processing returns to the above step S124, and the process of step S124 is repeated. If the game is to be ended, the processing of the flow chart ends. Hereinafter, the series of processes of steps S124 to S133 is repeatedly executed until it is determined in step S133 that the game is to be ended.

With reference to FIGS. 23 and 24, a description is given of the processing of a main body apparatus 2 to be set as a child apparatus. In FIG. 23, the processor 81 performs initialization in game processing (step S161), and the processing proceeds to the next step. For example, in the initialization, the processor 81 initializes parameters for performing the processing described below.

Next, the processor 81 starts wirelessly communicating with a main body apparatus 2 as a parent apparatus (step S162), and the processing proceeds to the next step. For example, if the processor 81 receives, by broadcast, parent apparatus information for communicating with another main body apparatus 2, the processor 81 transmits child apparatus information as a communication participation request (including identification information regarding the main body apparatus 2 including the processor 81) to the other main body apparatus 2, thereby establishing a connection (pairing) with the main body apparatus 2 as the parent apparatus.

Next, the processor 81 sets the main body apparatus 2 including the processor 81 as a child apparatus in the wireless communication and stores, in the parent apparatus/child apparatus setting data Dc, apparatus information (the identification number) regarding the parent apparatus with which the connection is established (step S163), and the processing proceeds to the next step.

Next, the processor 81 acquires operation data from the touch panel 13 of the main body apparatus 2 including the processor 81, the left controller 3, and/or the right controller 4 and updates the operation data Da (step S164), and the processing proceeds to the next step. Then, the processor 81 adds, to the touch position data Dd, operation data indicating a touch position obtained from the touch panel 13 of the main body apparatus 2 including the processor 81, as the history of new touch position data.

Next, the processor 81 determines whether or not it is after a positional relationship setting process (step S165). For example, if the setting completion flag indicated by the setting completion flag data Di is off, the determination of the processor 81 is affirmative in the above step S165. Then, if it is before the positional relationship setting process or during the positional relationship setting process, the processing proceeds to step S166. If, on the other hand, it is after the positional relationship setting process, the processing proceeds to step S169.

In step S166, the processor 81 places an input target image at a position including an input target position on the touch panel 13 (the display 12) of the main body apparatus 2 including the processor 81, and the processing proceeds to the next step. For example, with the center of the screen of the touch panel 13 (the display 12) of the main body apparatus 2 including the processor 81 as an input target position, the processor 81 sets the position of the input target image so that the center of the input target image Ie is placed at the input target position, thereby updating the input target image data Df.

Next, the processor 81 determines whether or not it is during the process of setting the positional relationship (step S167). For example, if the during-setting-process flag indicated by the during-setting-process flag data Dh is on, or if the processor 81 acquires, from the main body apparatus 2 as the parent apparatus, data indicating that the process of setting the positional relationship is started, the determination of the processor 81 is affirmative in the above step S167. Then, if it is during the process of setting the positional relationship, the processing proceeds to step S168. If, on the other hand, it is not during the process of setting the positional relationship, the processing proceeds to step S170.

In step S168, the processor 81 performs the positional relationship setting process in the child apparatus, and the processing proceeds to step S170. With reference to FIG. 24, a description is given of the positional relationship setting process in the child apparatus performed in the above step S168.

In FIG. 24, the processor 81 sets the during-setting-process flag to on (step S181), and the processing proceeds to the next step. For example, the processor 81 sets the during-setting-process flag indicated by the during-setting-process flag data Dh to on, thereby updating the during-setting-process flag data Dh.

Next, the processor 81 determines whether or not a touch operation on the touch panel 13 of the main body apparatus 2 including the processor 81 is performed (step S182). For example, if the latest touch position acquired in the above step S164 indicates that a touch operation is performed on the touch panel 13 of the main body apparatus 2 including the processor 81, the determination of the processor 81 is affirmative in the above step S182. Then, if the touch operation is performed, the processing proceeds to step S183. If, on the other hand, the touch operation is not performed, the processing proceeds to step S184.

In step S183, the processor 81 places the input object at a position including a position overlapping the latest touch position on the touch panel 13 of the main body apparatus 2 including the processor 81, and the processing proceeds to step S184. For example, the processor 81 sets the position of the input object so that the center of the input object image Is is placed at the latest touch position on the main body apparatus 2 including the processor 81 indicated by the touch position data Dd, thereby updating the input object data De.

In step S184, the processor 81 determines whether or not an error occurs in the positional relationship setting process. For example, in a case where an inappropriate touch operation is detected as the operation for setting the positional relationship, such as a case where a touch-off is performed before the position of a slide operation reaches a position overlapping the input target image displayed on the display 12 of the main body apparatus 2 including the processor 81, a case where the moving velocity of a touch position of a slide operation performed on the touch panel 13 of the main body apparatus 2 including the processor 81 exceeds a predetermined velocity, or a case where information indicating that an error occurs is acquired from the other main body apparatus 2, the determination of the processor 81 is affirmative in the above step S184. Then, if an error occurs in the positional relationship setting process, the processing proceeds to step S185. If, on the other hand, an error does not occur in the positional relationship setting process, the processing proceeds to step S186.

In step S185, the processor 81 sets the during-setting-process flag to off, and the processing proceeds to step S186. For example, the processor 81 sets the during-setting-process flag indicated by the during-setting-process flag data Dh to off, thereby updating the during-setting-process flag data Dh.

In step S186, the processor 81 determines whether or not a slide operation for setting the positional relationship reaches the input target position on the touch panel 13 of the main body apparatus 2 including the processor 81. For example, if the latest touch position acquired in the above step S164 overlaps the input target image Ie displayed on the display 12 of the main body apparatus 2 including the processor 81, it is determined that the slide operation for setting the positional relationship reaches the input target position, and the determination of processor 81 is affirmative in the above step S186. Then, if the above slide operation reaches the input target position, the processing proceeds to step S187. If, on the other hand, the slide operation does not reach the input target position, the processing of this subroutine ends.

In step S187, the processor 81 sets the during-setting-process flag to off, and the processing proceeds to the next step. For example, the processor 81 sets the during-setting-process flag indicated by the during-setting-process flag data Dh to off, thereby updating the during-setting-process flag data Dh.

Next, the processor 81 sets the setting completion flag to on (step S188), and the processing of this subroutine ends. For example, the processor 81 sets the setting completion flag indicated by the setting completion flag data Di to on, thereby updating the setting completion flag data Di. Then, the processor 81 erases both the input object image Is and the input target image Ie, thereby updating each of the input object data De and the input target image data Df to a non-display setting (e.g., NULL).

Referring back to FIG. 23, if it is determined in the above step S165 that it is after the positional relationship setting process, the processor 81 performs game processing based on the positional relationship with the other main body apparatus 2 (the parent apparatus) (step S169), and the processing proceeds to step S170. The process of displaying a game image on a plurality of displays 12 using the positional relationship between the displays 12 has been described above, and therefore is not described in detail here.

In step S170, the processor 81 performs a communication process with the other main body apparatus 2, and the processing proceeds to the next step. In this communication process, a touch position of a touch operation performed on the touch panel 13 of each apparatus and various data calculated based on each touch position are transmitted and received between the apparatuses every time frame processing is performed. Thus, processing performed by one of the main body apparatuses 2 is transmitted to the other main body apparatus 2, and each main body apparatus 2 can reference data of the other.

For example, the processor 81 updates reception data in the communication data Db using communication data received from the other main body apparatus 2. Then, the processor 81 performs processing based on the content of the reception data. As an example, if the processor 81 acquires, from the other main body apparatus 2, touch position data detected by the other main body apparatus 2, the processor 81 adds the touch position data as the history of new touch position data of the other apparatus to the touch position data Dd. As another example, if the processor 81 acquires, from the other main body apparatus 2, information indicating that an error occurs in the positional relationship setting process, the processor 81 performs the process of the above step S184 based on the information. If the processor 81 acquires, from the other main body apparatus 2 (the parent apparatus), information regarding the positional relationship set by the other main body apparatus 2 (the parent apparatus), the processor 81 updates the positional relationship data Dg using the information and uses the positional relationship data Dg in the process of the above step S169.

The processor 81 generates data to be transmitted to the other main body apparatus 2, appropriately stores the data in transmission data in the communication data Db, and transmits the transmission data to the other main body apparatus 2 (the parent apparatus) in the above step S170. As an example, the processor 81 stores various data calculated and set in the above processing in transmission data in the communication data Db and transmits the transmission data to the other main body apparatus 2.

Next, the processor 81 performs a display control process for generating a display image and displaying the display image on the display 12 (step S171), and the processing proceeds to the next step. For example, based on the input object data De, the processor 81 displays the input object image Is on the display 12. If the positional relationship with the other main body apparatus 2 is already set, the processor 81 displays a game image corresponding to the game processing in the above step S169 on the display 12, using a global coordinate space in a virtual game space based on the positional relationship.

Next, the processor 81 determines whether or not the game is to be ended (step S172). Examples of a condition for ending the game in the above step S172 include the fact that the result of the game is finalized, the fact that the user performs the operation for ending the game, and the like. If the game is not to be ended, the processing returns to the above step S164, and the process of step S164 is repeated. If the game is to be ended, the processing of the flow chart ends. Hereinafter, the series of processes of steps S164 to S172 is repeatedly executed until it is determined in step S172 that the game is to be ended.

As described above, in the exemplary embodiment, an image as a guide for performing a slide operation for setting the positional relationship between a plurality of main body apparatuses 2 is displayed. Thus, it is possible to notify the user in an easily understandable manner of how to perform the slide operation. For example, if the above image as the guide is not displayed, it is possible that an operation is quickly performed as in a flick operation. It is also possible that a sufficient touch operation is not performed on a touch panel 13 on which a touch operation is to be performed later to set the positional relationship. In the exemplary embodiment, the input object image Is following a slide operation is displayed, whereby it is possible to urge the user to slowly perform the slide operation, and it is also possible to prevent the above operation error.

In the above exemplary embodiment, to determine a slide operation crossing the gap between touch panels 13, if a touch-off is performed in an edge portion of one of the touch panels 13, and a touch-on is performed again in an edge portion of the other touch panel 13, it is determined that a slide operation is performed at the gap. Here, each of the edge portions may be an area including the furthest edge portion of the touch panel 13 and having a predetermined width from the furthest edge portion. The predetermined width may be any length so long as the trajectory of a certain slide operation can be ensured on both the touch panels 13.

In the above exemplary embodiment, a plurality of main body apparatuses 2 are used, and processing is performed in a shared manner by the processors 81 built into the main body apparatuses 2. The above example of the sharing of the processing, however, is merely an example. The processing may be shared in another form. All the processing may be performed by any one of the processors 81. In the second case, only a single information processing apparatus may include a processor, and a system may be formed by the combination of an information processing apparatus and at least one display device (a display including a touch panel) capable of communicating with the information processing apparatus.

Specifically, a system in which an information processing apparatus including a display and at least one display that does not have an information processing function are combined together, a system in which an information processing apparatus that does not include a display and a plurality of displays that do not have an information processing function are combined together, and the like are possible. In this case, the information processing apparatus may be a single control apparatus or a server capable of communicating with the plurality of display devices, and the information processing apparatus may control the display content of each display device. At least one of a plurality of displays used in the exemplary embodiment may be stationary.

As described above, if processing is shared by a plurality of main body apparatuses 2, transmission data to be transmitted and received between the apparatuses may be limited in accordance with this sharing form. For example, the transmission data may be limited to information necessary for the processing performed by each main body apparatus 2, and the main body apparatuses 2 may transmit and receive the data to and from each other.

In the above exemplary embodiment, a touch panel covering a display detects an operation for setting the positional relationship between a plurality of main body apparatuses 2. Alternatively, the operation for setting the positional relationship may be performed using another input device. For example, the positional relationship between the plurality of main body apparatuses 2 may be set by an operation using a pointing device that detects a position on a display pointed at by an input device from a spatially separate position.

In the above exemplary embodiment, the positional relationship between touch panels (displays) is set so that a vector obtained by a slide operation on one of the touch panels and a vector obtained by a slide operation on the other touch panel connect to each other in the direction of a straight line. Alternatively, the positional relationship may be set using another vector. For example, the positional relationship between the touch panels (the displays) may be set using a vector in a direction opposite to a vector calculated in the above exemplary embodiment (i.e., a chronologically reversed vector).

Further, the game system 1 may be any apparatus, and may be a mobile game apparatus, any mobile electronic device (a PDA (Personal Digital Assistant), a mobile phone, a personal computer, a camera, a tablet, or the like.

Further, the above descriptions have been given using an example where the game system 1 performs information processing (game processing) and a communication process. Alternatively, another apparatus may perform at least some of the processing steps. For example, if the game system 1 is further configured to communicate with another apparatus (e.g., another server, another image display device, another game apparatus, or another mobile terminal), the other apparatus may cooperate to perform the processing steps. Another apparatus may thus perform at least some of the processing steps, thereby enabling processing similar to that described above. Further, the above information processing (game processing) can be performed by a processor or the cooperation of a plurality of processors, the processor or the plurality of processors included in an information processing system including at least one information processing apparatus. Further, in the above exemplary embodiment, information processing can be performed by the processor 81 of the game system 1 executing a predetermined program. Alternatively, part or all of the processing of the flow charts may be performed by a dedicated circuit included in the game system 1.

Here, according to the above variations, it is possible to achieve the exemplary embodiment also by a system form such as cloud computing, or a system form such as a distributed wide area network or a local area network. For example, in a system form such as a distributed local area network, it is possible to execute the processing between a stationary information processing apparatus (a stationary game apparatus) and a mobile information processing apparatus (a mobile game apparatus) by the cooperation of the apparatuses. It should be noted that, in these system forms, there is no particular limitation on which apparatus performs the above processing. Thus, it goes without saying that it is possible to achieve the exemplary embodiment by sharing the processing in any manner.

Further, the processing orders, the setting values, the conditions used in the determinations, and the like that are used in the information above processing are merely illustrative. Thus, it goes without saying that the exemplary embodiment can be achieved also with other orders, other values, and other conditions.

Further, the above program may be supplied to the game system 1 not only through an external storage medium such as an external memory, but also through a wired or wireless communication link. Further, the program may be stored in advance in a non-volatile storage device included in the apparatus. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. When used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment can be used as an information processing system, an information processing apparatus, an information processing program, an information processing method, and the like that are capable of notifying a user in an easily understandable manner of an operation for setting the positional relationship between a plurality of displays.

What is claimed is:

1. An information processing system including at least an information processing apparatus, the information processing system comprising:
   a first display;
   a second display;
   a first input portion configured to detect a coordinate input to the first display;
   a second input portion configured to detect a coordinate input to the second display;
   one or more processors; and
   one or more memories storing instructions that, when executed, cause the information processing system to:
   display, at a position including coordinates of an input start possible point on the first display, an image of a first movement object indicating the input start possible point;
   determine whether or not a first coordinate input detected by the first input portion includes an input to the position including the coordinates of the input start possible point;
   if the first coordinate input includes the input to the position including the coordinates of the input start possible point, display the first movement object by moving a position of the first movement object so that the first movement object is located at coordinates of a first continuous coordinate input to the first display detected continuously from the first coordinate input, and determine whether or not the first continuous coordinate input satisfies a first coordinate condition;
   if the first continuous coordinate input satisfies the first coordinate condition, determine whether or not a second coordinate input is detected by the second input portion after the first continuous coordinate input, and the detected second coordinate input satisfies a second coordinate condition;
   if the second coordinate input is detected by the second input portion, and the detected second coordinate input satisfies the second coordinate condition, display a second movement object by moving a position of the second movement object so that the second movement object is located at coordinates of a second continuous coordinate input to the second display detected continuously from the second coordinate input, and determine whether or not the second continuous coordinate input includes an input to a position including specified coordinates on the second display;
   if the second continuous coordinate input includes the input to the position including the specified coordinates, determine a positional relationship between the first display and the second display based on a trajectory of coordinates of the first continuous coordinate input and a trajectory of coordinates of the second continuous coordinate input;
   determine whether or not a condition that at least one of the first continuous coordinate input and the second continuous coordinate input is determined as an inappropriate operation is satisfied; and
   if the condition that at least one of the first continuous coordinate input and the second continuous coordinate input is determined as the inappropriate operation is satisfied, display the first movement object by moving the first movement object to the position including the coordinates of the input start possible point.

2. The information processing system according to claim 1, wherein
   the determination of whether or not the condition that at least one of the first continuous coordinate input and the second continuous coordinate input is determined as the inappropriate operation is satisfied includes determining whether or not a condition that the second continuous coordinate input is determined as the inappropriate operation is satisfied.

3. The information processing system according to claim 1, wherein
using the specified coordinates on the second display as an input target point, an image indicating the input target point is displayed at a position including coordinates of the input target point.

4. The information processing system according to claim 3, wherein
the display of the image indicating the input target point on the second display includes displaying, as the image indicating the input target point, an image corresponding to a shape of the first movement object at the position including the coordinates of the input start possible point.

5. The information processing system according to claim 3, wherein
the display of the image of the first movement object indicating the input start possible point on the first display includes placing the image of the first movement object indicating the input start possible point in a center portion of the first display, and
the display of the image indicating the input target point on the second display includes placing the image indicating the input target point in a center portion of the second display.

6. The information processing system according to claim 3, further comprising:
a third display; and
a third input portion configured to detect a coordinate input to the third display, wherein
the display of the image indicating the input target point on the second display includes, if a positional relationship between the second display and the third display is to be further set after the positional relationship between the first display and the second display is set, displaying, at a position including coordinates of an input start possible point on the second display, an image indicating the input start possible point.

7. The information processing system according to claim 1, wherein
the determination of whether or not the condition that at least one of the first continuous coordinate input and the second continuous coordinate input is determined as the inappropriate operation is satisfied includes, if a moving velocity of the coordinates of at least one of the first continuous coordinate input and the second continuous coordinate input exceeds a specified velocity, determining that the condition that at least one of the first continuous coordinate input and the second continuous coordinate input is determined as the inappropriate operation is satisfied.

8. The information processing system according to claim 1, wherein
the determination of whether or not the condition that at least one of the first continuous coordinate input and the second continuous coordinate input is determined as the inappropriate operation is satisfied includes, if a time in which the coordinate input to the first display is not detected reaches a specified time in the first continuous coordinate input, or a time in which the coordinate input to the second display is not detected reaches a specified time in the second continuous coordinate input, determining that the condition that at least one of the first continuous coordinate input and the second continuous coordinate input is determined as the inappropriate operation is satisfied.

9. The information processing system according to claim 1, further comprising:
a third display; and
a third input portion configured to detect a coordinate input to the third display, wherein
the display of the image of the first movement object indicating the input start possible point on the first display includes, if a positional relationship between the first display and the third display is to be further set after the positional relationship between the first display and the second display is set, displaying, at the position including the coordinates of the input start possible point on the first display, the image of the first movement object indicating the input start possible point again.

10. The information processing system according to claim 1, wherein
the determination of whether or not the condition that at least one of the first continuous coordinate input and the second continuous coordinate input is determined as the inappropriate operation is satisfied includes, if the coordinate input to the first display and the second display ceases to be detected before the second continuous coordinate input includes the input to the position including the specified coordinates, determining that the condition that at least one of the first continuous coordinate input and the second continuous coordinate input is determined as the inappropriate operation is satisfied.

11. The information processing system according to claim 1, wherein
the determination of whether or not the condition that at least one of the first continuous coordinate input and the second continuous coordinate input is determined as the inappropriate operation is satisfied includes, if the one or more processors acquire information indicating that a coordinate input to another display that is not included in the information processing system before the second continuous coordinate input includes the input to the position including the specified coordinates, determining that the condition that at least one of the first continuous coordinate input and the second continuous coordinate input is determined as the inappropriate operation is satisfied.

12. The information processing system according to claim 1, wherein the image of the first movement object indicating the input start possible point, and an image indicating the input target point are images for guiding a user through an operation for setting the positional relationship between the first display and the second display.

13. The information processing system of claim 1, wherein if input from the position including the coordinates of the input start possible point to the position including coordinates of an input target point does not satisfy a specified condition, an operation error is indicated to the user.

14. An information processing apparatus, comprising:
a processor; and
a memory configured to store computer readable instructions that, when executed by the processor, cause the information processing apparatus to:
display, at a position including coordinates of an input start possible point on a first display, an image of a first movement object indicating the input start possible point;

determine whether or not a detected first coordinate input includes an input to the position including the coordinates of the input start possible point;

if the first coordinate input includes the input to the position including the coordinates of the input start possible point, display the first movement object by moving a position of the first movement object so that the first movement object is located at coordinates of a first continuous coordinate input to the first display detected continuously from the first coordinate input, and determine whether or not the first continuous coordinate input satisfies a first coordinate condition;

if the first continuous coordinate input satisfies the first coordinate condition, determine whether or not a second coordinate input is detected after the first continuous coordinate input, and the detected second coordinate input satisfies a second coordinate condition;

if the second coordinate input is detected, and the detected second coordinate input satisfies the second coordinate condition, display a second movement object by moving a position of the second movement object so that the second movement object is located at coordinates of a second continuous coordinate input to a second display detected continuously from the second coordinate input, and determine whether or not the second continuous coordinate input includes an input to a position including specified coordinates on the second display;

if the second continuous coordinate input includes the input to the position including the specified coordinates, determine a positional relationship between the first display and the second display based on a trajectory of coordinates of the first continuous coordinate input and a trajectory of coordinates of the second continuous coordinate input;

determine whether or not a condition that at least one of the first continuous coordinate input and the second continuous coordinate input is determined as an inappropriate operation is satisfied; and if the condition that at least one of the first continuous coordinate input and the second continuous coordinate input is determined as the inappropriate operation is satisfied, display the first movement object by moving the first movement object to the position including the coordinates of the input start possible point.

15. A non-transitory computer-readable storage medium having stored therein instructions that, when executed by a processor of an information processing apparatus, cause the information processing apparatus to provide execution comprising:

displaying, at a position including coordinates of an input start possible point on a first display, an image of a first movement object indicating the input start possible point;

determining whether or not a detected first coordinate input includes an input to the position including the coordinates of the input start possible point;

if the first coordinate input includes the input to the position including the coordinates of the input start possible point, displaying the first movement object by moving a position of the first movement object so that the first movement object is located at coordinates of a first continuous coordinate input to the first display detected continuously from the first coordinate input, and determining whether or not the first continuous coordinate input satisfies a first coordinate condition;

if the first continuous coordinate input satisfies the first coordinate condition, determining whether or not a second coordinate input is detected after the first continuous coordinate input, and the detected second coordinate input satisfies a second coordinate condition;

if the second coordinate input is detected, and the detected second coordinate input satisfies the second coordinate condition, displaying a second movement object by moving a position of the second movement object so that the second movement object is located at coordinates of a second continuous coordinate input to a second display detected continuously from the second coordinate input, and determining whether or not the second continuous coordinate input includes an input to a position including specified coordinates on the second display;

if the second continuous coordinate input includes the input to the position including the specified coordinates, determining a positional relationship between the first display and the second display based on a trajectory of coordinates of the first continuous coordinate input and a trajectory of coordinates of the second continuous coordinate input;

determining whether or not a condition that at least one of the first continuous coordinate input and the second continuous coordinate input is determined as an inappropriate operation is satisfied; and if the condition that at least one of the first continuous coordinate input and the second continuous coordinate input is determined as the inappropriate operation is satisfied, displaying the first movement object by moving the first movement object to the position including the coordinates of the input start possible point.

16. An information processing method, comprising:

displaying, at a position including coordinates of an input start possible point on a first display, an image of a first movement object indicating the input start possible point;

determining whether or not a detected first coordinate input includes an input to the position including the coordinates of the input start possible point;

if the first coordinate input includes the input to the position including the coordinates of the input start possible point, displaying the first movement object by moving a position of the first movement object so that the first movement object is located at coordinates of a first continuous coordinate input to the first display detected continuously from the first coordinate input, and determining whether or not the first continuous coordinate input satisfies a first coordinate condition;

if the first continuous coordinate input satisfies the first coordinate condition, determining whether or not a second coordinate input is detected after the first continuous coordinate input, and the detected second coordinate input satisfies a second coordinate condition;

if the second coordinate input is detected, and the detected second coordinate input satisfies the second coordinate condition, displaying a second movement object by moving a position of the second movement object so that the second movement object is located at coordinates of a second continuous coordinate input to a second display detected continuously from the second coordinate input, and determining whether or not the second continuous coordinate input includes an input to a position including specified coordinates on the second display;

if the second continuous coordinate input includes the input to the position including the specified coordinates, determining a positional relationship between the first display and the second display based on a trajectory of coordinates of the first continuous coordinate input and a trajectory of coordinates of the second continuous coordinate input;

determining whether or not a condition that at least one of the first continuous coordinate input and the second continuous coordinate input is determined as an inappropriate operation is satisfied; and if the condition that at least one of the first continuous coordinate input and the second continuous coordinate input is determined as the inappropriate operation is satisfied, displaying the first movement object by moving the first movement object to the position including the coordinates of the input start possible point.

* * * * *